(12) United States Patent     (10) Patent No.:   US 12,589,800 B2

Mcvicar et al.     (45) Date of Patent:    Mar. 31, 2026

(54) STEERING SYSTEMS FOR LIFT TRUCKS

(71) Applicant: Combilift, County Monaghan (IE)

(72) Inventors: Martin Mcvicar, County Monaghan (IE); Robert Moffett, County Monaghan (IE); Mark Whyte, County Monaghan (IE)

(73) Assignee: COMBILIFT, Monaghan Town (IE)

( * ) Notice: Subject to any disclaimer, the term of this patent is extended or adjusted under 35 U.S.C. 154(b) by 426 days.

(21) Appl. No.: 18/275,460

(22) PCT Filed: Jan. 7, 2022

(86) PCT No.: PCT/EP2022/050247
§ 371 (c)(1),
(2) Date: Aug. 2, 2023

(87) PCT Pub. No.: WO2022/167171
PCT Pub. Date: Aug. 11, 2022

(65) Prior Publication Data
US 2024/0109584 A1     Apr. 4, 2024

(30) Foreign Application Priority Data

Feb. 2, 2021    (GB) ...................................... 2101426

(51) Int. Cl.
*B62D 7/15*       (2006.01)
*B62D 7/14*       (2006.01)
(Continued)

(52) U.S. Cl.
CPC ........... *B62D 7/1509* (2013.01); *B62D 7/142* (2013.01); *B62D 9/002* (2013.01);
(Continued)

(58) Field of Classification Search
CPC ...... B62D 7/1509; B62D 7/142; B62D 9/002; B66F 9/07509; B66F 9/07568; B66F 9/07572; B66F 9/22
See application file for complete search history.

(56) References Cited

U.S. PATENT DOCUMENTS

| | | | | |
|---|---|---|---|---|
| 2002/0148669 A1* | 10/2002 | Sugata | ................ | B66F 9/07568 |
| | | | | 180/411 |
| 2018/0015950 A1* | 1/2018 | Zhang | ................... | B62D 7/1581 |
| 2021/0402875 A1* | 12/2021 | Pham | ........................ | B62D 7/14 |

FOREIGN PATENT DOCUMENTS

| | | | | | |
|---|---|---|---|---|---|
| CN | 119503014 A | * | 2/2025 | ............. | B62D 5/046 |
| CN | 120270334 A | * | 7/2025 | ........... | B62D 15/021 |

(Continued)

*Primary Examiner* — Drew J Brown

(74) *Attorney, Agent, or Firm* — Whiteford, Taylor & Preston, LLP; Gregory M. Stone

(57) ABSTRACT

A lift truck (10) has a pair of wheel assemblies (21) each of which is rotatable about a pivot point (24) relative to the chassis (12) of the truck through at least 90 degrees between a forward mode and a sideward mode. The wheel (18,20) of each assembly is laterally offset from the assembly's pivot point (24), causing the wheel to describe an arcuate path over the ground as it transitions between the forward and sideward modes. During the transition, an actuator acts on each wheel assembly (21) to pivot the assembly about the pivot point (24), while drive is applied to the wheel to positively drive the wheel along the arcuate patch at a speed that matches the pivotal rotation caused by the actuator. This positive drive imparted to the wheels (18,20) during the transition prevents the truck from rolling if it is located on a slope during the change in orientation of the wheel assemblies (21).

25 Claims, 18 Drawing Sheets

(51) Int. Cl.
   *B62D 9/00*          (2006.01)
   *B66F 9/075*          (2006.01)
(52) U.S. Cl.
   CPC ...... *B66F 9/07509* (2013.01); *B66F 9/07568*
                    (2013.01); *B66F 9/07572* (2013.01)

(56)              References Cited

FOREIGN PATENT DOCUMENTS

| | | | | | |
|---|---|---|---|---|---|
| JP | H0556755 U | * | 7/1993 | | |
| JP | 2025082993 A | * | 5/2025 | .......... | B60W 30/182 |

* cited by examiner

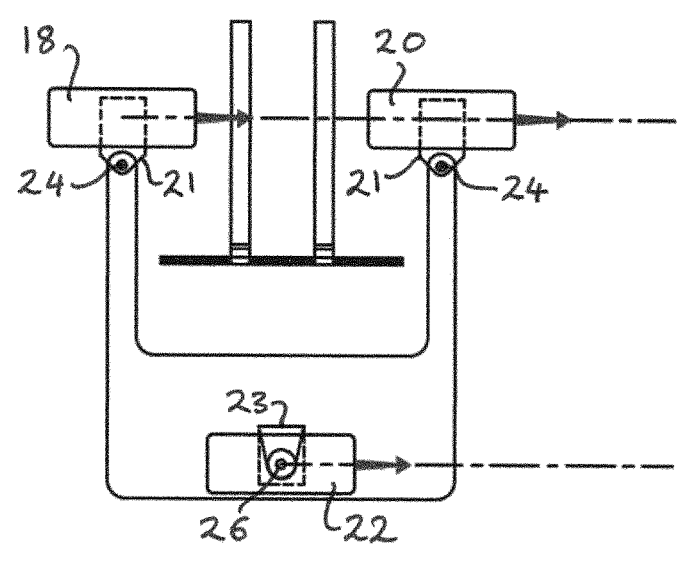
Fig. 5
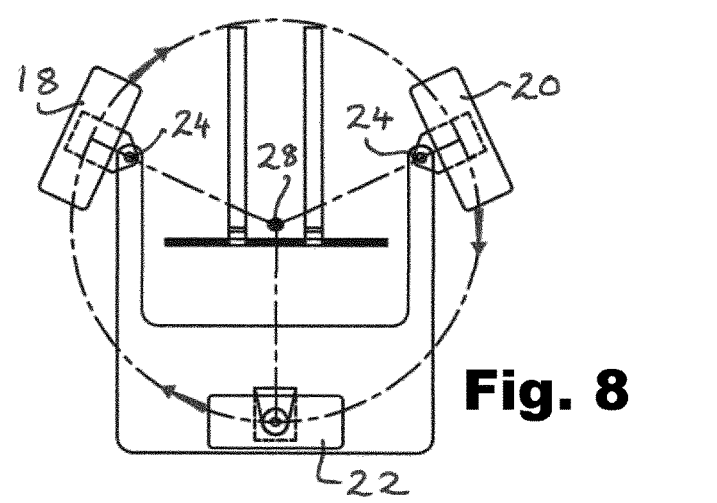
Fig. 6
Fig. 7
Fig. 8

ON

ON

ON

STEERING SYSTEMS FOR LIFT TRUCKS

TECHNICAL FIELD

This invention relates to steering systems for lift trucks, and in particular to lift trucks which can be steered in forward and sideward modes.

BACKGROUND ART

WO 03/059799 describes a lift truck having forward and sideward modes of operation. The document describes and shows a three-wheel truck with two front wheels and one rear wheel, all of the wheels being driven and steerable.

In the forward mode of operation (or "forward-reverse mode", since the steering setup is the same whether the truck drives in forward or reverse direction) the two front wheels are fixed in a straight-ahead angular position parallel to the forks and the main longitudinal axis of the chassis, and the steering mechanism is coupled to the rear wheel to steer the truck. In the sideward mode of operation, the three wheels are turned to be perpendicular to the longitudinal axis, and the rear wheel's steering angle is fixed in that position, while the steering mechanism is coupled to the front wheels which steer in synchronicity to direct the truck.

The wheels in this truck are steered in position from above, i.e. a bogey with the wheel is mounted to the chassis on a pivot that is vertically located above the centre of the wheel, and a steering motor rotates the bogey, so that the wheels can be turned through 90 degrees in position on the ground. During the change of mode, the brakes are applied to the wheels so that if the truck is, for example, disposed on a slope with its longitudinal axis perpendicular to the slope, it will not start to roll sideways as the wheels are turned sideways. Once the mode change is complete, drive can be applied to the wheels and the brakes released.

Such an arrangement is disadvantageous due to the space required above the bogey to accommodate the steering mechanism. In some specialised trucks, such as a lorry-mounted forklift (where the forklift is carried on a lorry) the height of the chassis and wheel mechanism should be minimised.

DISCLOSURE OF THE INVENTION

In a first independent aspect of invention there is provided a steering system for a lift truck, the lift truck having a chassis with a longitudinal axis, the steering system comprising:

a pair of wheel assemblies, each of which is mounted on the chassis at a respective pivot point, the wheel assemblies being spaced apart from one another in a transverse direction on opposite sides of said longitudinal axis;

each wheel assembly having a respective ground-engaging wheel rotatable on a respective axle, the ground-engaging wheel being laterally offset from the pivot point on which the wheel assembly is mounted to the chassis;

wherein each wheel assembly is rotatable about its pivot point in a plane parallel to a ground surface when the lift truck is supported on the ground surface, with freedom to rotate through at least 90 degrees between a forward mode wherein the wheel axle is directed transversely towards the longitudinal axis and a sideward mode wherein the wheel axle is parallel to the longitudinal axis, wherein the lateral offset of the wheel from the pivot point causes the wheel to describe an arcuate path over the ground as it transitions between the forward and sideward modes;

an actuator acting on each wheel assembly operable to control the angular orientation of the wheel assembly about the pivot point;

drive means operating on each of said wheels to drive the wheels over the ground; and a controller which is operable to cause a transition between forward and sideward modes for each of the wheel assemblies by simultaneously actuating the actuator of a wheel assembly to cause said wheel assembly to pivotally rotate about its pivot point, and actuating the drive means operating on the wheel of said wheel assembly to impart positive drive to said wheel and drive said wheel along said arcuate path to assist the pivotal rotation caused by the actuator.

By laterally offsetting the wheels from the pivot points on which the wheel assemblies are mounted, the steering actuator no longer needs to be above the assembly or bogey. This then enables the height of the mechanism to be reduced. Laterally offsetting the wheels, however, prevents them from changing their angular orientation while remaining in the same fixed position: they must travel over the ground. By applying a positive drive to the wheels that drives the wheels along the arcuate path defined by the wheel following the path arising from its lateral offset from the pivot point of the wheel assembly with the chassis, the driving of the wheel assists the pivotal rotation caused by the actuator. This reduces the stress on the pivoting mechanism and decreases the chance that the truck will unintentionally roll or shift position during the mode change manoeuvre.

If the truck is situated on a slope, the positive drive imparted by the drive means to the wheel will help to prevent the truck from rolling down the slope.

Furthermore, because the steering actuator is aided by the powered wheel drive, this reduces the forces within the system when changing modes and allows for smaller and more compact actuators, while also reducing wear and tear, and the likelihood of failure of the actuator if resistance is met while transitioning the wheel.

The provision of the simultaneous and complementary control to the actuator and the drive means has the effect of reducing tyre scrub and hence tyre wear.

Preferably, the drive means is controlled to drive the wheel along said arcuate path at a speed that matches the pivotal rotation caused by the actuator.

The speed matching need not be exact: it is sufficient that the wheel is imparted with positive drive at a speed that avoids wheel scrubbing and that counteracts any rolling tendency if the manoeuvre is made on sloping ground given the weight of the vehicle and the range of slopes on which it is designed to operate. Preferably, however, the speed matching is done accurately. For example, the controller may be preferably designed to drive the wheel at a speed over the ground that matches the speed imparted to that wheel over the ground by the pivoting mechanism to within say 10% or 5%.

Preferably, the drive means is controlled to drive the wheel by a distance that matches the length of said arcuate path.

The transition between forward and sideward modes may be from forward to sideward mode or from sideward to forward mode.

The controller is preferably configured or programmed with a sequence of operations to perform the actuation of the actuator and drive means of the pair of wheel assemblies in a controlled and co-ordinated manner to perform the transition.

The rotation of the pair of wheel assemblies about their respective pivot points can be controlled to occur simultaneously, or in a controlled sequence, or independently of one another.

Preferably, the controller is further operable to control a braking system of the forklift truck, such that a brake for each of said wheels may be independently applied or released.

In a preferred embodiment, during the transition, the controller is configured to cause a brake to be applied to each of said wheels while it is not being moved by the pivotal rotation of the associated wheel assembly about its pivot point.

Further preferably, the controller is configured to cause the brake to be released for each wheel while the associated wheel assembly is being pivotally rotated.

In this way, if the front wheel assemblies are pivotally rotated at different times, additional stability is achieved by braking the non-pivoting front wheel as the pivoting front wheel makes its transition, the brakes being sequentially released or applied depending on whether a wheel is currently being pivotally rotated or not.

Preferably, the controller applies the brake on each of said wheels before beginning the transition and on completing the transition.

Preferably, where there is a third wheel spaced apart from the pair of wheel assemblies, this wheel is also braked while the wheel assemblies are being pivotally rotated.

The truck will typically be a three-wheel or four-wheel truck (though more wheels could be present as the skilled person will readily appreciate).

Preferably the drive means to each of the pair of wheels is an independent electric drive motor.

Using electric motors for the drive, compared with hydraulic drive or a differential powered from a drive shaft as in a conventional vehicle, results in greater control during the transition. This is due to the fact that with a hydraulic drive the hydraulic fluid takes the path of least resistance and tends to balance the forces to each driven wheel. Where the external resistance to turning experienced by the two wheels is different, such as when the vehicle is on a slope during the manoeuvre, the turning power applied to each wheel will be different. Similar considerations apply where a differential distributes power to the two wheels.

Preferably the actuator for each wheel assembly is a hydraulic actuator.

Further, preferably, the respective hydraulic actuators to the pair of wheel assemblies are ganged, with one actuator being a master and the other being a slave, such that the displacement of the two hydraulic actuators is the same and the steering angle of each wheel is equal in magnitude.

Preferably, the angular positions of the wheels are changed in equal and opposite directions during the transition.

Where the truck is a three-wheel truck, a third wheel will typically be mounted on the chassis spaced apart from the wheel assemblies in the longitudinal direction.

Preferably the third wheel is disposed on the longitudinal axis of the chassis.

Preferably, the third wheel is steerable through at least 90 degrees between a forward mode wherein a third wheel axle is directed transversely towards the longitudinal axis and a sideward mode wherein the third wheel axle is parallel to the longitudinal axis.

Further, preferably, the third wheel is controlled to transition between the forward mode and the sideward mode in concert with the pair of wheel assemblies.

Further, preferably, the controller is operable to cause said transition of the third wheel between the forward mode and the sideward mode in concert with the pair of wheel assemblies as part of a programmed sequence of operations.

In certain embodiments, the third wheel is pivotally mounted on the chassis to rotate in place without translation as it transitions between forward and sideward modes. This may be done, for example, by having the pivotal mounting directly above the point of contact between the third wheel and the ground (when the truck is in normal orientation on level ground).

Preferably, in such cases, the controller is further adapted to cause the third wheel to be braked throughout the transition.

The braking of a wheel can be mechanical or can be achieved by electric braking of an electric motor, or hydraulic braking of a hydraulic motor, for example.

In other embodiments, the third wheel is mounted on a third wheel assembly in the same manner as said pair of wheel assemblies, the third wheel assembly being pivotally mounted on the chassis and the third wheel being offset from the pivotal mounting point of the third wheel assembly.

In such embodiments, the brake on the third wheel is preferably released during the pivotal rotation of the third wheel assembly and applied at other times during the transition.

Preferably, the steering system further comprises a third actuator acting on the third wheel assembly to control the angular orientation of the third wheel assembly about the pivot point, a drive means is provided operating on the third wheel to drive the third wheel over the ground, and said controller is operable to simultaneously actuate the third actuator to cause the third wheel assembly to pivotally rotate about its pivot point, and actuate the third wheel drive means to impart positive drive to the third wheel and drive the third wheel along an arcuate path at a speed that matches the pivotal rotation caused by the third actuator.

Where the truck is a four-wheel truck, a fourth wheel is preferably disposed, spaced apart from the third wheel on opposite sides of the longitudinal axis, and the third and fourth wheels are spaced apart from the pair of wheel assemblies in the longitudinal direction.

Where there is a fourth wheel, all of the features applying above to the steering and control of the third wheel may equally and additionally be applied to the fourth wheel. Accordingly:

preferably, the fourth wheel is steerable through at least 90 degrees between a forward mode wherein a fourth wheel axle is directed transversely towards the longitudinal axis and a sideward mode wherein the fourth wheel axle is parallel to the longitudinal axis.

further, preferably, the fourth wheel is controlled to transition between the forward mode and the sideward mode in concert with the pair of wheel assemblies.

further, preferably, the controller is operable to cause said transition of the fourth wheel between the forward mode and the sideward mode in concert with the pair of wheel assemblies as part of a programmed sequence of operations.

in certain embodiments, the fourth wheel is pivotally mounted on the chassis to rotate in place without translation as it transitions between forward and sideward modes.

preferably, in such cases, the controller is further adapted to cause the fourth wheel to be braked until the transition is complete for each wheel.

in other embodiments, the fourth wheel is mounted on a fourth wheel assembly in the same manner as said pair of wheel assemblies, the fourth wheel assembly being pivotally mounted on the chassis and the fourth wheel being offset from the pivotal mounting point of the fourth wheel assembly.

preferably, the steering system further comprises a fourth actuator acting on the fourth wheel assembly to control the angular orientation of the fourth wheel assembly about the pivot point, a drive means is provided operating on the fourth wheel to drive the fourth wheel over the ground, and said controller is operable to simultaneously actuate the fourth actuator to cause the fourth wheel assembly to pivotally rotate about its pivot point, and actuate the fourth wheel drive means to impart positive drive to the fourth wheel and drive the fourth wheel along an arcuate path at a speed that matches the pivotal rotation caused by the fourth actuator.

It will be appreciated that in all cases where functionality is assigned to a controller, this encompasses a distributed architecture with a plurality of controllers acting together to provide said functionality.

There is also provided a second independent aspect of invention, namely a steering system for a lift truck, the lift truck having a chassis with a longitudinal axis, the steering system comprising:

a first wheel assembly and a second wheel assembly, each mounted on the chassis at a respective pivot point, the first and second wheel assemblies being spaced apart from one another in a transverse direction on opposite sides of said longitudinal axis;

each wheel assembly having a respective ground-engaging wheel rotatable on a respective axle, the ground-engaging wheel being laterally offset from the pivot point on which the wheel assembly is mounted to the chassis;

each wheel assembly having a respective brake which can be selectively applied to the respective ground-engaging wheel in response to a control input;

wherein each wheel assembly is rotatable about its pivot point in a plane parallel to a ground surface when the lift truck is supported on the ground surface, with freedom to rotate through at least 90 degrees between a forward mode wherein the wheel axle is directed transversely towards the longitudinal axis and a sideward mode wherein the wheel axle is parallel to the longitudinal axis, wherein the lateral offset of the wheel from the pivot point causes the wheel to describe an arcuate path over the ground as it transitions between the forward and sideward modes;

an actuator acting on each wheel assembly operable to control the angular orientation of the wheel assembly about the pivot point;

drive means operating on each of said wheels to drive the wheels over the ground; and a controller which is operable to cause a transition between forward and sideward modes for each of the wheel assemblies by (i) simultaneously actuating the actuator of the first wheel assembly to cause the first wheel assembly to pivotally rotate about its pivot point with the wheel of the first wheel assembly unbraked, and braking the wheel of the second wheel assembly during the pivotal rotation of the first wheel assembly, followed by (ii) simultaneously actuating the actuator of the second wheel assembly to cause the second wheel assembly to pivotally rotate about its pivot point with the wheel of the second wheel assembly unbraked, and braking the wheel of the first wheel assembly during the pivotal rotation of the second wheel assembly.

By sequentially pivoting the wheel assemblies, with the non-pivoting assembly being braked while the other is pivoted, additional traction and resistance to undesired movement of the truck is achieved.

In embodiments described below, the wheel that is unbraked and that is pivotally being rotated is in a freewheel state, which simplifies the mode change operation by removing the need to apply positive drive to a wheel during its transition.

However as an alternative in this aspect of the invention, the pivotal rotation of a wheel assembly may optionally also be assisted by driving the wheel of the pivoting wheel assembly across the ground as previously described.

Furthermore, the preferred features listed above in relation to the first independent aspect of invention and the dependent claims associated with that aspect of invention can equally be applied to the second independent aspect of invention. The skilled person will appreciate that the same embodiments support both aspects, provided that the wheel assemblies are controlled to be rotated sequentially of one another.

Therefore, advantageously in the second independent aspect, the following features may also be present:

Preferably, said controller may simultaneously actuate the actuator of a wheel assembly to cause said wheel assembly to pivotally rotate about its pivot point, and actuate the drive means operating on the wheel of said wheel assembly to impart positive drive to said wheel and drive said wheel along said arcuate path to assist the pivotal rotation caused by the actuator.

Preferably, the drive means is controlled to drive the wheel along said arcuate path at a speed that matches the pivotal rotation caused by the actuator.

Preferably, the drive means is controlled to drive the wheel by a distance that matches the length of said arcuate path.

The controller is preferably configured or programmed with a sequence of operations to perform the actuation of the actuator and drive means of the pair of wheel assemblies in a controlled and co-ordinated manner to perform the transition The transition between forward and sideward modes may be from forward to sideward mode or from sideward to forward mode.

The truck will typically be a three-wheel or four-wheel truck (though more wheels could be present as the skilled person will readily appreciate).

Preferably the drive means to each of the pair of wheels is an independent electric drive motor.

The actuator for each wheel assembly may be a hydraulic actuator. However, due to the fact that the wheel assemblies will not in this embodiment be simultaneously actuated, the pivoting rotation may be independently driven by electric motors instead.

Preferably, the angular positions of the wheels are changed in equal and opposite directions when the transition is completed.

Where the truck is a three-wheel truck, a third wheel will typically mounted on the chassis spaced apart from the wheel assemblies in the longitudinal direction.

Preferably the third wheel is disposed on the longitudinal axis of the chassis.

Preferably, the third wheel is steerable through at least 90 degrees between a forward mode wherein a third wheel axle is directed transversely towards the longitudinal axis and a sideward mode wherein the third wheel axle is parallel to the longitudinal axis.

Further, preferably, the third wheel is controlled to transition between the forward mode and the sideward mode in concert with the pair of wheel assemblies.

Further, preferably, the controller is operable to cause said transition of the third wheel between the forward mode and the sideward mode in concert with the pair of wheel assemblies as part of a programmed sequence of operations.

In certain embodiments, the third wheel is pivotally mounted on the chassis to rotate in place without translation as it transitions between forward and sideward modes.

Preferably, in such cases, the controller is further adapted to cause the third wheel to be braked until the transition is complete for each wheel.

Where the third wheel is mounted for pivotal rotation about an axis that passes through the point of contact between the wheel and the ground, the third wheel may remain braked during its pivotal rotation.

The braking of a wheel can be mechanical or can be achieved by electric braking of an electric motor, or hydraulic braking of a hydraulic motor, for example.

In other embodiments, the third wheel is mounted on a third wheel assembly in the same manner as said pair of wheel assemblies, the third wheel assembly being pivotally mounted on the chassis and the third wheel being offset from the pivotal mounting point of the third wheel assembly.

Preferably in these embodiments, the steering system further comprises a third actuator acting on the third wheel assembly to control the angular orientation of the third wheel assembly about the pivot point.

A drive means is provided operating on the third wheel to drive the third wheel over the ground, and said controller may be operable to simultaneously actuate the third actuator to cause the third wheel assembly to pivotally rotate about its pivot point, and actuate the third wheel drive means to impart positive drive to the third wheel and drive the third wheel along an arcuate path at a speed that matches the pivotal rotation caused by the third actuator. Alternatively, the third wheel can be in a freewheel state as it is pivotally rotated, in which case the other two wheels are preferably stationary and braked during the third wheel transition.

Where the truck is a four-wheel truck, a fourth wheel is preferably disposed, spaced apart from the third wheel on opposite sides of the longitudinal axis, and the third and fourth wheels are spaced apart from the pair of wheel assemblies in the longitudinal direction.

Where there is a fourth wheel, all of the features applying above to the steering and control of the third wheel may equally and additionally be applied to the fourth wheel. Accordingly:

preferably, the fourth wheel is steerable through at least 90 degrees between a forward mode wherein a fourth wheel axle is directed transversely towards the longitudinal axis and a sideward mode wherein the fourth wheel axle is parallel to the longitudinal axis.

further, preferably, the fourth wheel is controlled to transition between the forward mode and the sideward mode in concert with the pair of wheel assemblies.

further, preferably, the controller is operable to cause said transition of the fourth wheel between the forward mode and the sideward mode in concert with the pair of wheel assemblies as part of a programmed sequence of operations.

in certain embodiments, the fourth wheel is pivotally mounted on the chassis to rotate in place without translation as it transitions between forward and sideward modes.

preferably, in such cases, the controller is further adapted to cause the fourth wheel to be braked until the transition is complete for each wheel.

in other embodiments, the fourth wheel is mounted on a fourth wheel assembly in the same manner as said pair of wheel assemblies, the fourth wheel assembly being pivotally mounted on the chassis and the fourth wheel being offset from the pivotal mounting point of the fourth wheel assembly.

preferably, the steering system further comprises a fourth actuator acting on the fourth wheel assembly to control the angular orientation of the fourth wheel assembly about the pivot point, a drive means is provided operating on the fourth wheel to drive the fourth wheel over the ground, and said controller is operable to simultaneously actuate the fourth actuator to cause the fourth wheel assembly to pivotally rotate about its pivot point, and actuate the fourth wheel drive means to impart positive drive to the fourth wheel and drive the fourth wheel along an arcuate path at a speed that matches the pivotal rotation caused by the fourth actuator.

Alternatively, the fourth wheel is permitted to undergo its angular change of orientation in a freewheel state, with the other wheel assemblies preferably braked and stationary to prevent rolling of the truck during the further wheel transition.

BRIEF DESCRIPTION OF THE DRAWINGS

The invention will now be illustrated by the following description of embodiments thereof, given by way of example only with reference to the accompanying drawings, in which:

FIG. 5 shows the lift truck of FIG. 1 in a sideward mode of operation steering straight;

FIGS. 6 and 7 show the lift truck of FIG. 5 when steering to the left and right, respectively;

FIG. 8 shows the lift truck of FIG. 5 steering in a carousel mode about a point centred between the three wheels;

DETAILED DESCRIPTION OF PREFERRED EMBODIMENTS

Figure 1:
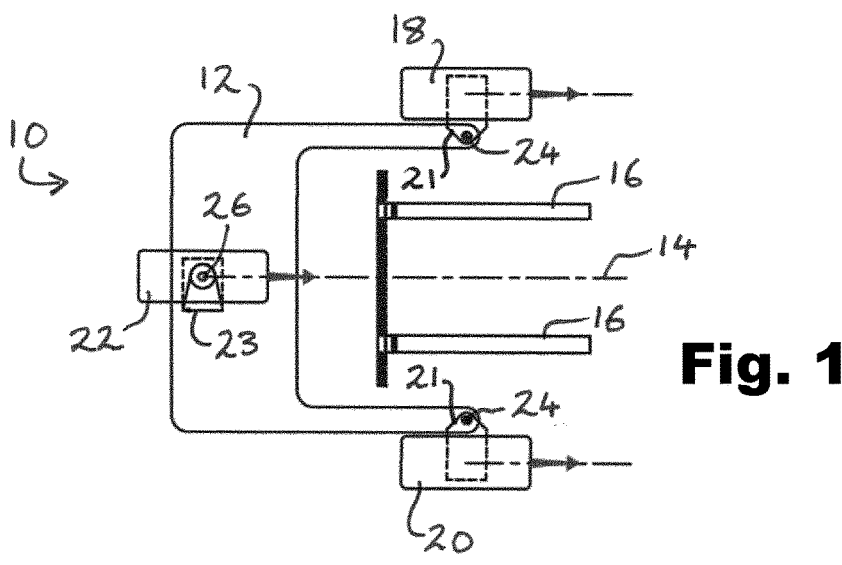
FIG. 1 is a schematic plan view of a lift truck in a forward mode of operation steering straight.

In FIG. 1 there is indicated, generally at 10, a lift truck having a chassis 12 with a longitudinal axis 14, and a pair of forks 16 mounted on a lift mechanism (not shown).

A pair of front wheels, namely a left front wheel 18 and a right front wheel 20, are mounted on the chassis via respective wheel assemblies, indicated schematically at 21 and described in greater detail below. The wheels (and wheel assemblies) are spaced apart from one another in a transverse direction on opposite sides of the longitudinal axis 14, with the forks 16 disposed between the front wheels for stability when a heavy load is being carried. Each of the front wheels is driven by a respective electric motor (not shown), and each wheel assembly is steerable via a respective actuator (not shown).

A rear wheel (or third wheel) 22 is mounted on the chassis along the longitudinal axis 14, and spaced apart from the front wheels 18, 20 in the longitudinal direction. The rear wheel is mounted to the chassis via a wheel assembly or bogey indicated schematically at 23, and is driven by its own electric motor (not shown) and steered by a third actuator (not shown).

It can be seen that the pair of wheel assemblies 21 are mounted to the chassis 12 on respective pivot points 24 with the front wheels 18, 20 being laterally offset from the pivot points 24 (i.e. offset in a plane parallel to the ground surface, as seen when viewed from above as in FIG. 1). The rear wheel assembly 23 is mounted to the chassis on a pivot point 26 which is directly above the centre of the rear wheel 22.

Figure 2:
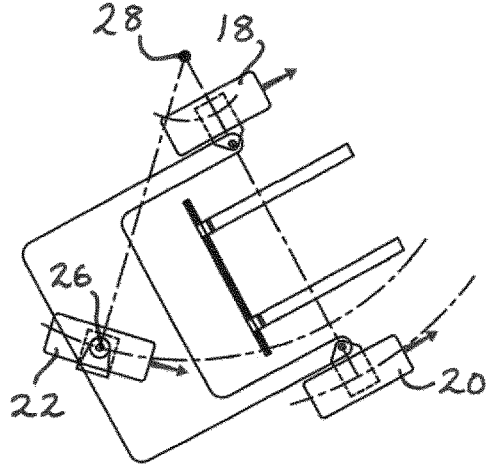
FIGS. 2 and 3 show the lift truck of FIG. 1 steering left and right, respectively.
Figure 3:
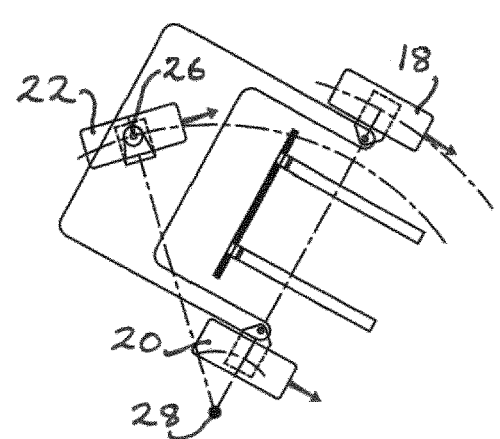

In the forward mode of operation (which term is used whether the drive direction to the three wheels is forward or reverse) the steering angle of the front wheels is fixed to be parallel to the longitudinal axis 14, i.e. with the wheel axles transverse or perpendicular to the longitudinal axis 14. Steering is accomplished by changing the angle of the rear wheel 22. FIG. 2 shows the truck driving forward (with the forks leading) and steering to the left. The rear wheel 22 defines the steering direction and the truck is following an arcuate path about a centre point 28. The rear wheel is still positioned directly under the pivot point 26. FIG. 3 similarly shows the truck steering to the right.

Figure 4:
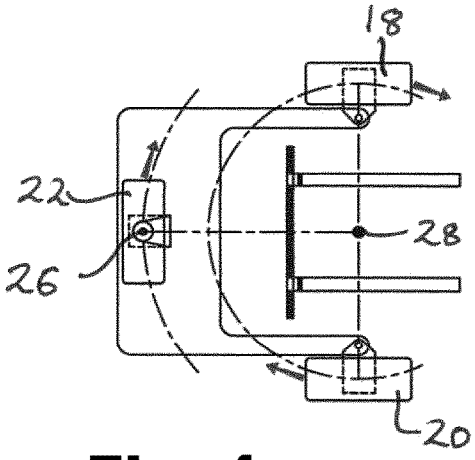
FIG. 4 shows the lift truck of FIG. 1 steering in a carousel mode about a point centred between the front wheels.

In FIG. 4 the rear wheel has been turned 90 degrees to the right so that the centre point on which the steering arc is defined is positioned centrally between the front wheels 18, 20. This will cause the truck to spin about the forks.

FIGS. 5-8 show the same truck when in a sideward mode. As seen in FIG. 5, all three of the wheels 18, 20, 22, have been turned so that they are directed transverse to the longitudinal axis. The rear wheel 22 is turned 90 degrees to the right, and the two front wheels have been moved on their respective wheel assemblies 21 which are moved forward and inward, having moved in an arc centred on their respective pivot points 24.

In FIG. 5 the truck is being driven straight in the direction indicated by the arrows alongside the three wheels (left to right as seen on the page). While in the sideward mode, the rear wheel 22 is fixed in this angular position, and steering is accomplished by the front wheels 18, 20.

FIG. 6 shows the truck steering left in the sideward mode so that it follows an arcuate path centred on the point 28, with the left front wheel 18 angled further clockwise and the right front wheel 20 angled further anticlockwise than in FIG. 5. In FIG. 7, the truck is steered in the opposite direction, and the centre of the arcuate path is coincident with the pivot point 26 of the rear wheel assembly 23.

In FIG. 8 the truck is in a carousel steering position, with the front wheels 18, 20 angled sufficiently to bring the centre of rotation 28 within the footprint of the truck and approximately equidistant from all three wheels, so that the truck when driven will spin in place around the centre point 28.

It will be appreciated that the three wheels, being driven by electric motors, can be driven in forward or reverse mode in any of the steering configurations shown in any of FIGS. 1-8.

Figure 9:
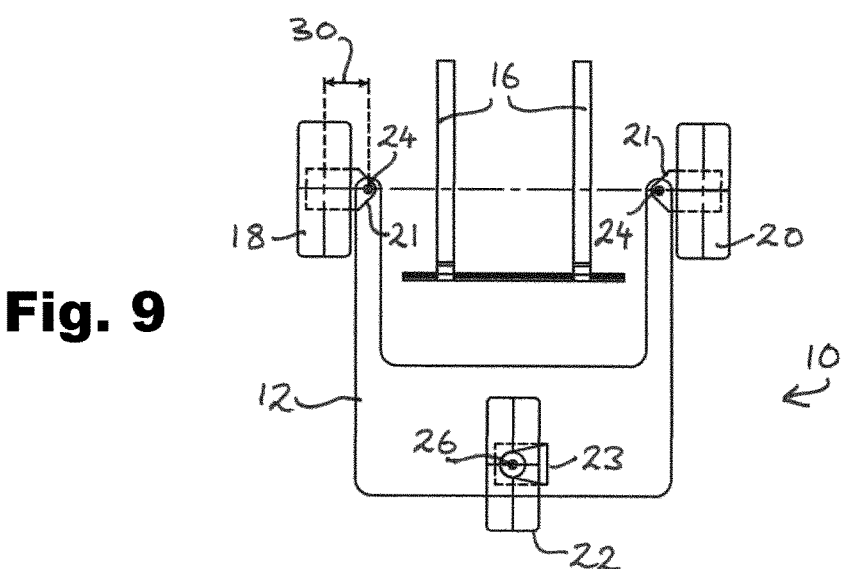
FIGS. 9-11 show successive stages in a transition from forward mode to sideward mode.
Figure 10:
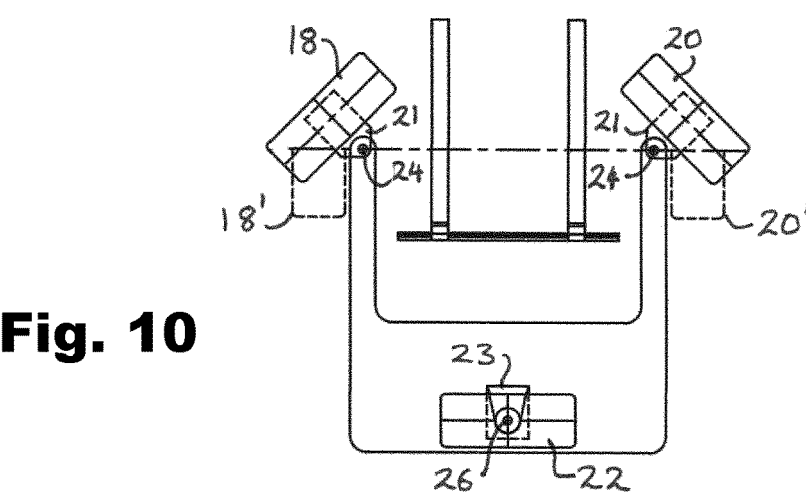
Figure 11:
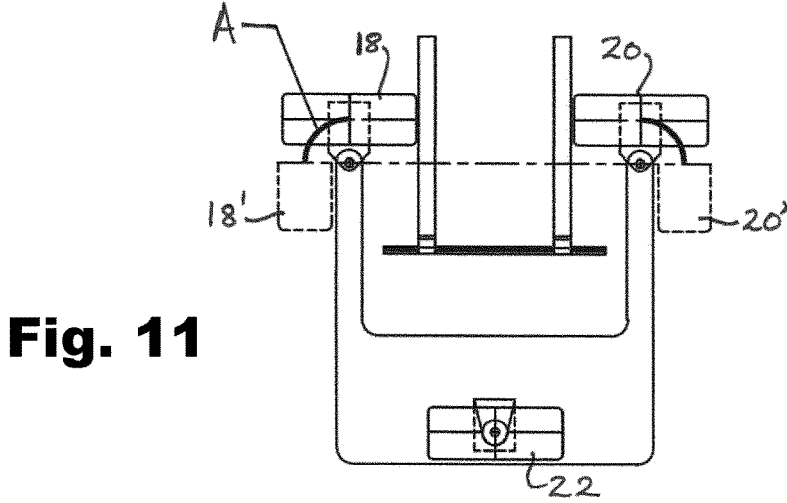

FIGS. 9-11 show the truck as it transitions from the forward mode (FIG. 9) to the sideward mode (FIG. 11).

In FIG. 9, the dimension 30 indicates the lateral offset between the pivot point 24 of the left front wheel assembly 21 and the centre of the left front wheel 18. It can be seen that a similar offset exists for the right front wheel 20.

When a signal is received by a controller to transition from forward to sideward mode, the brakes are applied to all three wheels, and the third actuator rotates the rear wheel 22 through 90 degrees while keeping the brake applied (FIG. 10). That wheel 22 is not offset in this embodiment, and rotates in place about the pivot point 26 which is located directly over the centre of the wheel. As mentioned earlier, the brakes can be provided as mechanical brakes, as electric braking of a motor on the wheel, or by hydraulic braking. A combination of braking mechanisms can be applied to different wheels, or on the same wheel.

Then the front wheel assemblies are driven by respective actuators, while forward drive is applied to the two front wheels, to pivot the assemblies around the respective pivot points 24 through the position shown in FIG. 10 until the position of FIG. 11 is reached.

Referring to FIGS. 10 and 11 the original wheel positions from FIG. 9 are indicated in broken outline at 18' and 20'. As seen in FIG. 11, indicated at "A" and shown in a heavy line, the centre of the left front wheel 18 describes a quarter-circle arc as it moves from position 18' to its transverse orientation.

During the transition, the brakes on the front wheels are released, and the actuator's turning force is assisted by the electric motors, under control of the controller, being caused to drive the front left wheel and front right wheel in the forward direction by an amount equal to the path length of the arc A. The drive speed applied to each wheel is controlled to match the actuator's movement of the wheel assemblies, so that there is no tyre scrub and the electric drive motor on the wheel works to assist the hydraulic actuator acting on the wheel assembly 21.

Once the transition is complete as in FIG. 10 the brake on the rear wheel can be released. The steering controls then switch over to transmit steering controls to the front wheels, so that the actuators, operating in tandem, steer the truck as shown in FIGS. 5-8.

Figure 12:
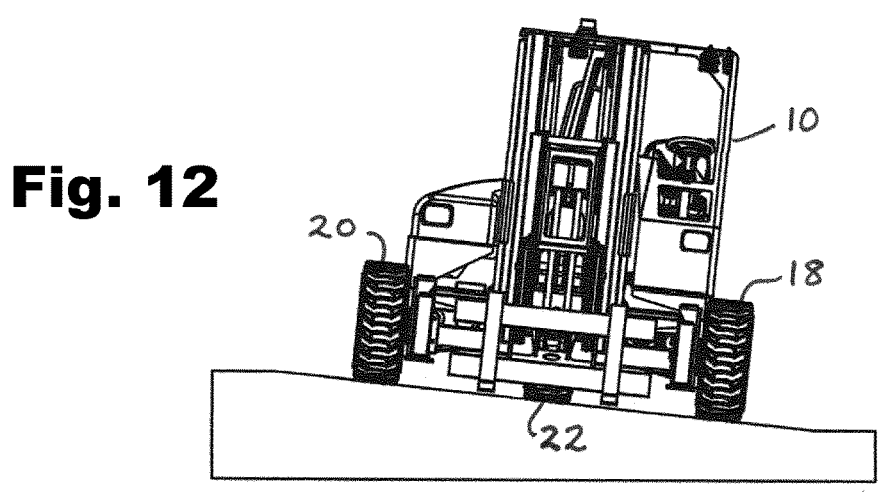
FIGS. 12-14 are elevation views of a truck located on a slope making the transition illustrated in FIGS. 9-11.
Figure 13:
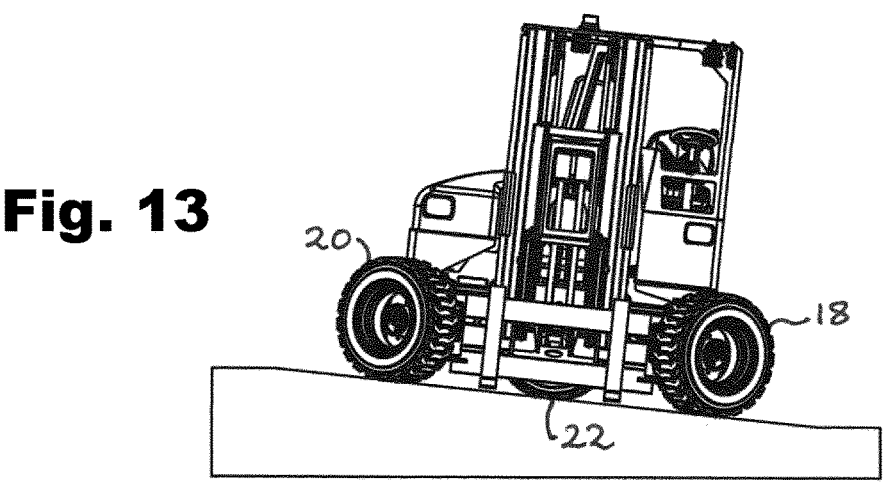
Figure 14:
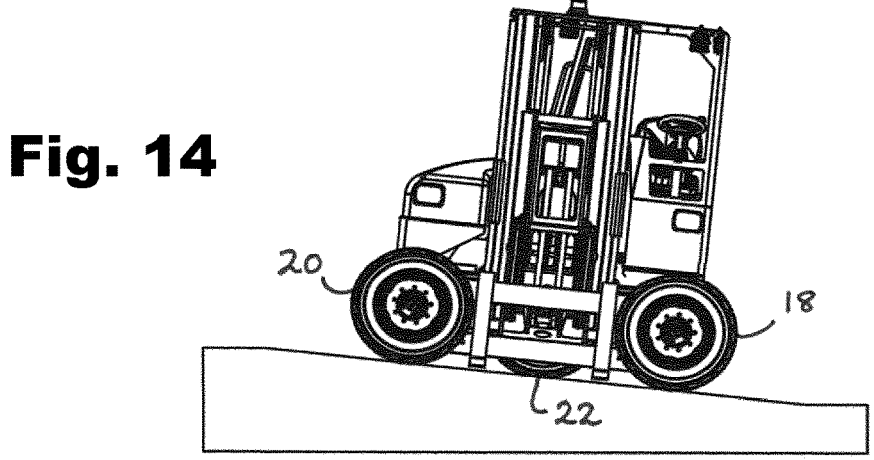

The transition from sideward to reverse mode is a reversal of the same sequence. The front wheels are driven in reverse by an amount equal to the path length of A as the actuators draw the wheel assemblies back from the position in FIG. 11 to the position in FIG. 9, in both cases the drive to the wheels and the operation of the actuators being controlled by the controller. FIGS. 12-14 show a truck 10 located on a slope 32, with the truck sideways on the slope so that the left front wheel 18 is downhill from the right front wheel. As seen in FIGS. 12-14, the rear wheel 22, although partly obscured, is visible under the truck and is located along the central longitudinal axis that runs from front to rear.

The truck undergoes the same sequence of operations in FIGS. 12-14 as was shown schematically in FIGS. 9-11. Accordingly, the rear wheel 22 is braked and turned perpendicular to the axis (the brakes preventing the wheel from running downhill in FIGS. 13 and 14 when it is aligned with the downhill direction). The front wheels are rotated about a pivot point, between the position in FIG. 12 where they are aligned across the slope to the position in FIG. 14 where they are aligned in the downhill direction.

Because of the application of a positive drive to the wheels during this operation, not only is assistance given to the actuators that move the front wheel assemblies around their respective pivot points, but the wheels are under driven control to counteract and prevent the tendency for the front of the truck to roll downhill during the manoeuvre, as would otherwise tend to occur if the wheels were undriven. Furthermore, by controlling the driven distance and the drive speed of the front wheels to match the path followed by the wheels as the actuator moves the assemblies through 90 degrees about their pivot points, the truck is always under control during the manoeuvre.

Figure 15:
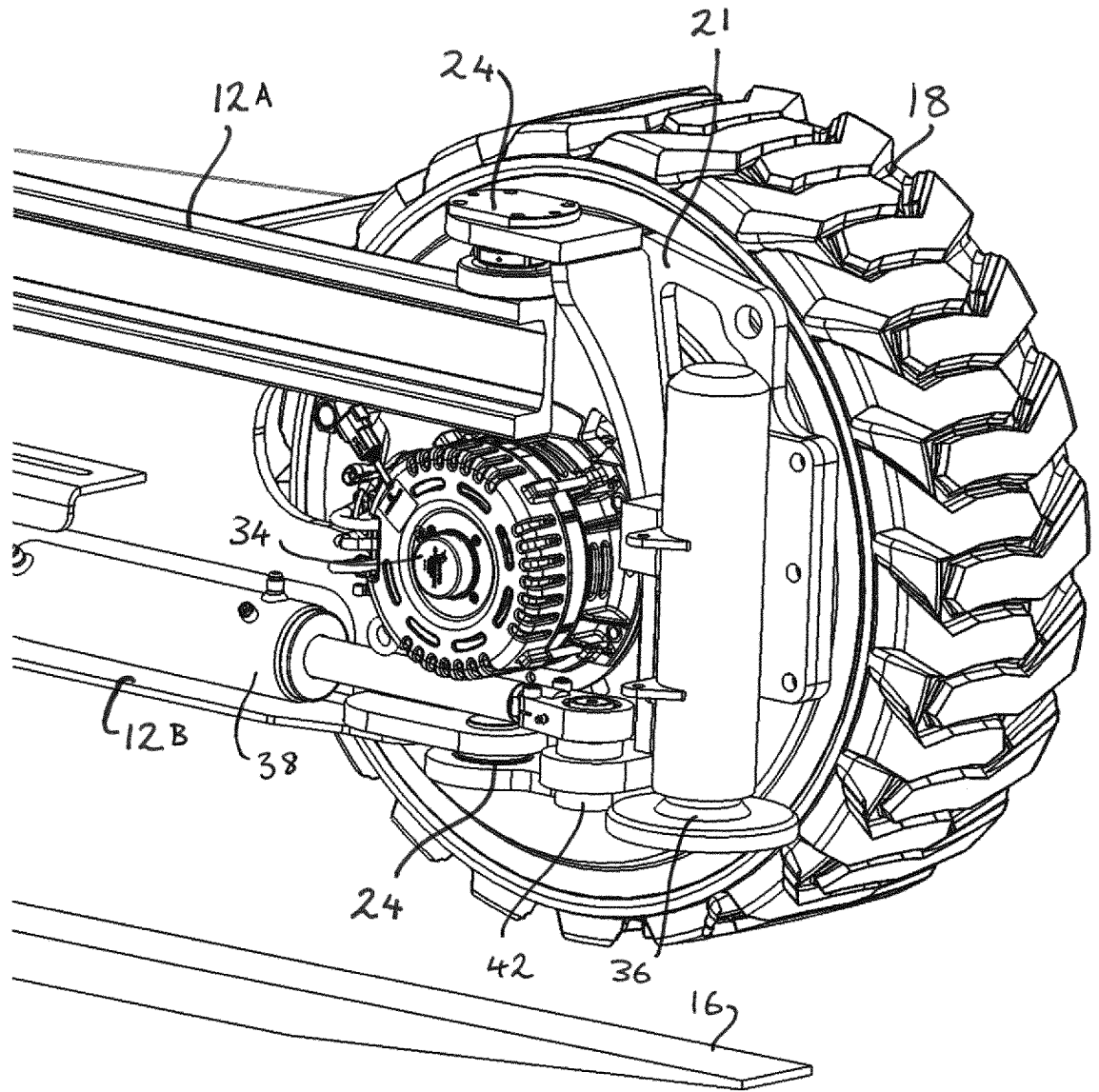
FIG. 15 shows a perspective view of a left front wheel assembly of a truck steering in a straight-ahead direction when the truck is in forward mode.

FIG. 15 shows the left front wheel assembly of the forklift truck 10, the right front wheel being a mirror image insofar as is relevant to this description. FIG. 15 shows the steering in a straight-ahead direction when the truck is in forward mode.

Figure 16:
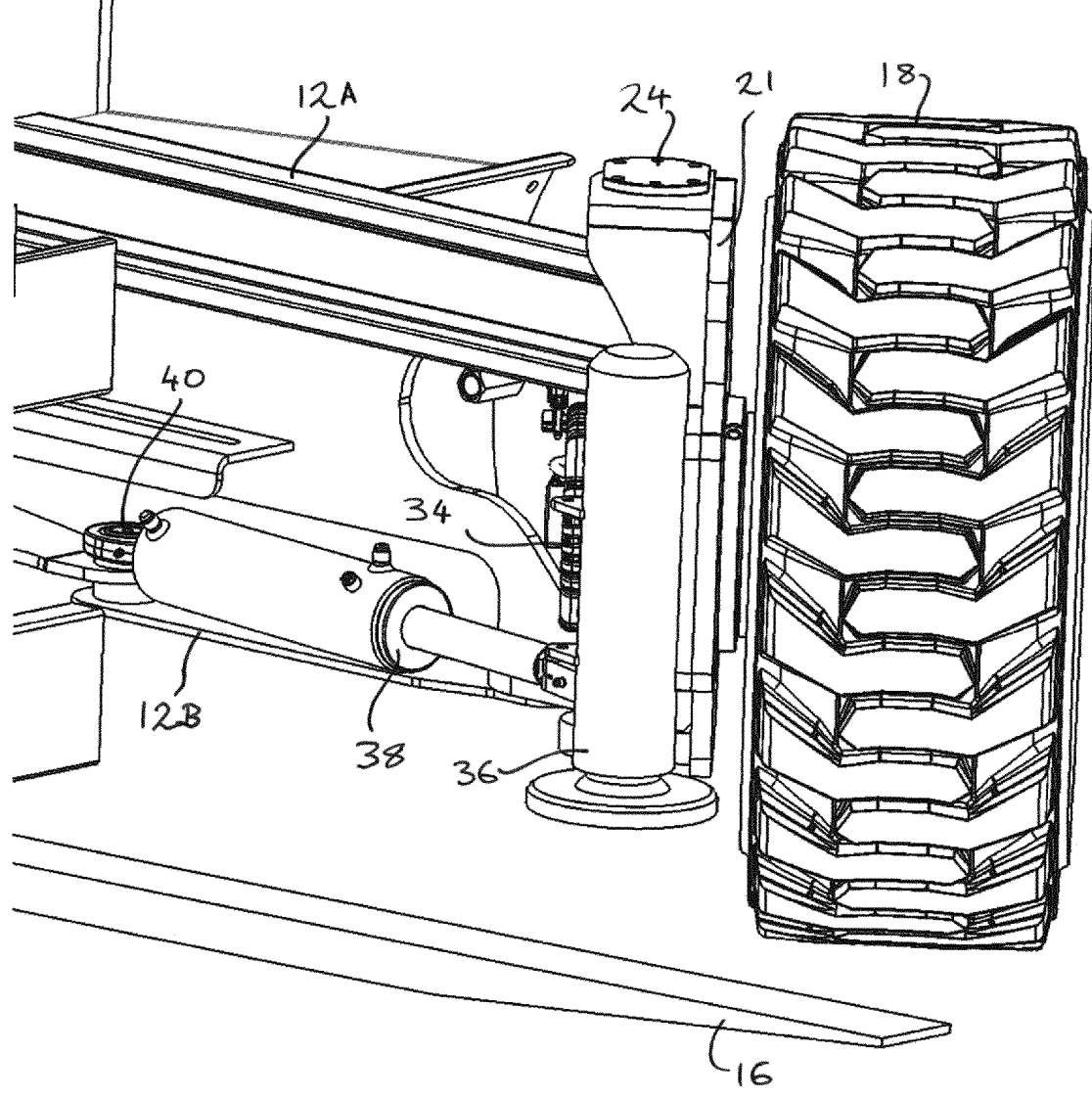
FIG. 16 shows the wheel assembly of FIG. 15 in the middle of the transition to sideward mode, or with the wheel assembly steered to the right during normal operation.

FIG. 16 shows the same portion of the truck as FIG. 15, with the wheel assembly in the middle of the transition to sideward mode, or with the wheel assembly steered to the right during normal operation.

A portion of the chassis 12 is visible as upper and lower arms 12A and 12B, extending forwardly parallel to one of the forks 16. Each of the arms supports a respective pivot point 24 upon which a wheel assembly 21 is mounted for pivotal rotation about a vertical axis passing through the pivot points, as seen in FIG. 16 when compared with FIG. 15.

Referring back to FIG. 15, a hub-mounted electric motor 34 provides the motive or driving power to the wheel when powered according to a suitable throttle signal. Each of the three wheels is independently powered by a respective such motor. Visible at the front of the wheel assembly is a lifting ram 36 that can be extended downward to lift the wheel off the ground. The steering of the wheel assembly is controlled by a steering cylinder 38, which is affixed between the chassis arm 12B at a pivot 40 (as seen best in FIG. 16) and the wheel assembly 21 at a pivot 42 (as seen best in FIG. 15). It can be seen that in steering the wheel to the right, the cylinder has been partially retracted relative to the position in FIG. 15. Further retraction of the cylinder would complete the transition to the neutral steering position of sideward mode (turned through 90 degrees to the right from the FIG. 15 position). It will be appreciated that the cylinder be retracted further, beyond the position required to turn it 90 degrees to achieve the neutral steering position in sideward mode, so that when driving in sideward mode, it can be steered both left and right, as seen in e.g. FIGS. 2 and 3. In this embodiment, the cylinder at full extension places the wheel in the straight ahead position of FIG. 15 because when in forward mode the front wheels are fixed and the rear wheel steers, but the skilled person will appreciate that this implementation detail can be varied and a steering arrangement could be provide to allow the wheels to move through a greater angle of rotation.

Figure 17:
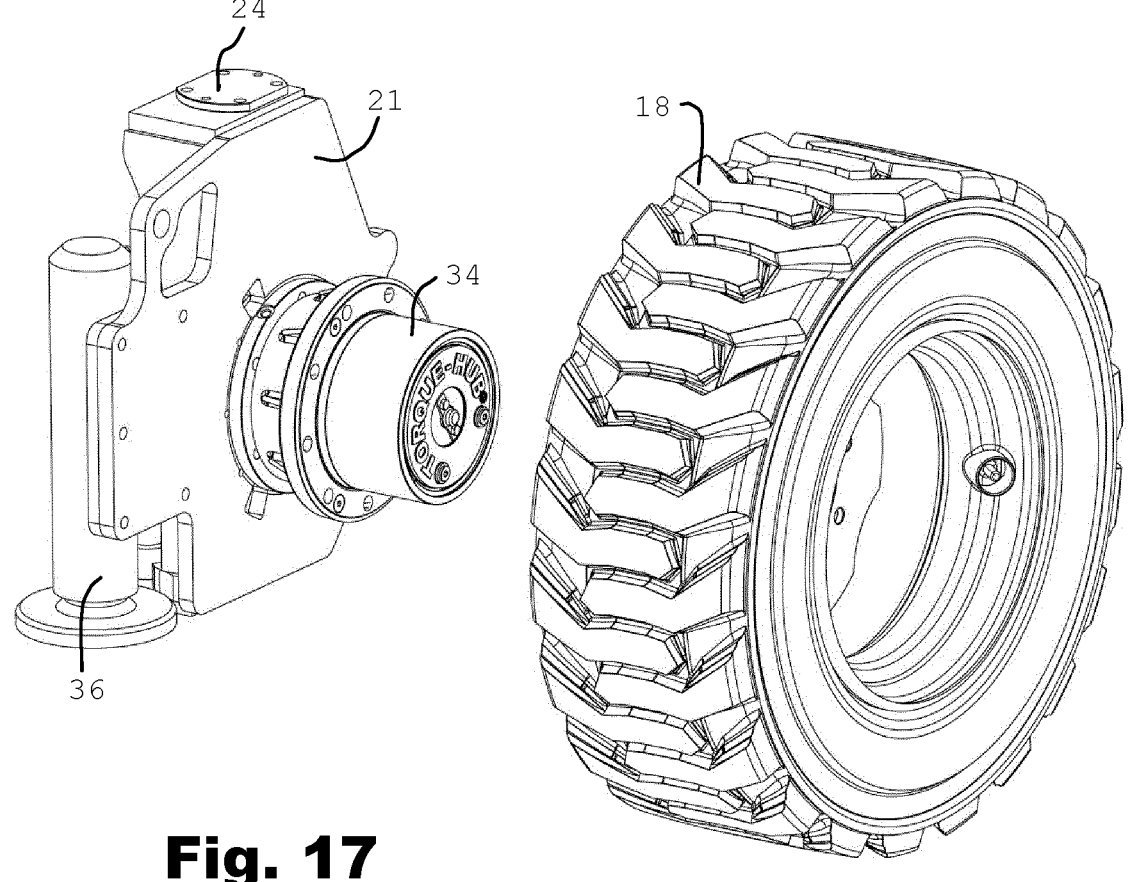
FIG. 17 shows the wheel assembly of FIG. 15, with the wheel unmounted, and viewed from the outer side.

FIG. 17 shows the details of the wheel assembly 21 with the wheel 18 removed, viewed from the outside. Thus, the wheel assembly 21 has hub 34 mounted thereon, with the wheel 18 being mountable on the hub. The lifting ram 36 and pivot 24 are also visible.

The hub 34 includes an integrated gearbox and a spring applied hydraulically released (SAHR) parking brake. While the SAHR parking brake is mechanical, as already mentioned the skilled person may brake the wheels electrically or hydraulically.

Figure 18:
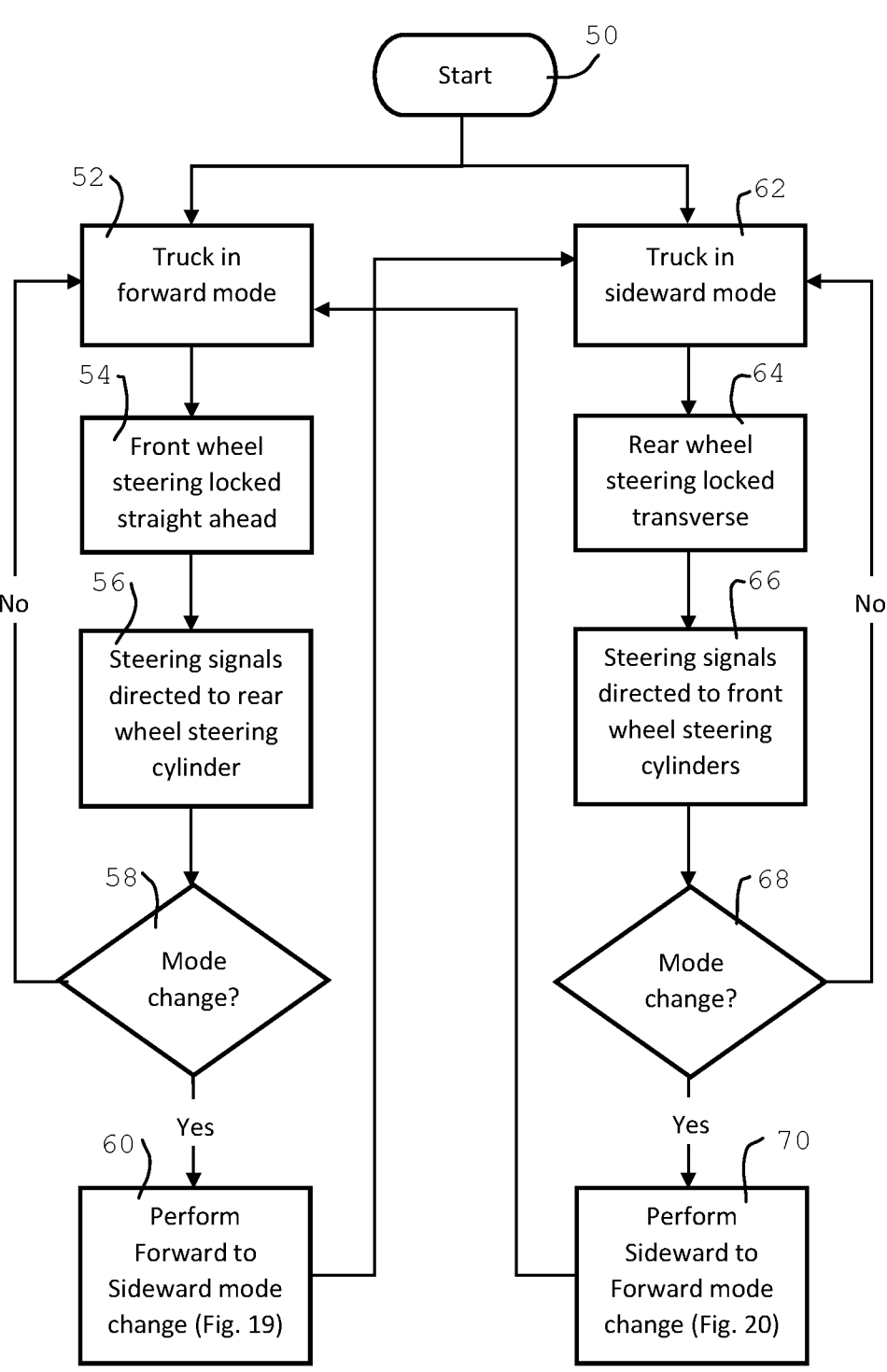
FIG. 18 is an overall flowchart of the steering operation of the truck in both forward and sideward modes.

FIG. 18 is a flowchart of the steering control which is implemented in the truck using a combination of electronic and hydraulic controls. The driver operates electronic controls to select a forward mode or a sideward mode, and an electronic controller outputs appropriate control signals to control hydraulic valves to implement the chosen mode. Steering is mechanically implemented by a hydraulic circuit which receives steering inputs from a steering wheel under normal operation and which receives steering inputs from the electronic controller when implementing a mode change from forward to sideward mode or vice versa. In FIG. 18, the procedure starts 50 with the truck in either forward or sideward mode, depending on the current wheel orientation. Describing first the situation with the truck in forward mode 52, the front wheel steering control locks the wheel into a straight-ahead position 54, and all steering signals are directed to the rear wheel steering cylinder 56. The controller checks for a mode change signal being input by the operator, decision 58. If no mode change signal is detected, the process loops back on the "no" branch and the truck remains in forward mode.

If, however, a mode change instruction is received (such as by the operator pressing a "sideward mode" button on the steering controls), then the process moves to step 60 to perform the change from forward to sideward mode, as will be described in relation to FIG. 19.

After the mode change operation completes, the process of FIG. 18 moves to step 62, where the truck is in sideward mode. The rear wheel is locked in a transverse position 64, and all steering signals are now directed to the front steering wheels to steer the truck 66. Again the controller checks for a mode change signal being input by the operator, decision 68. If no mode change signal is detected, the process loops back on the "no" branch and the truck remains in sideward mode.

If, however, a mode change instruction is received (such as by the operator pressing a "forward mode" button on the steering controls), then the process moves to step 70 to perform the change from forward to sideward mode, as will be described in relation to FIG. 20, following which the process will revert to step 52 with the truck once again in forward mode.

In this way, the steering signals can either be controlled according to the forward mode branch of FIG. 18 or the sideward mode branch, with the transitions now described below in relation to FIGS. 19 and 20.

Figure 19:
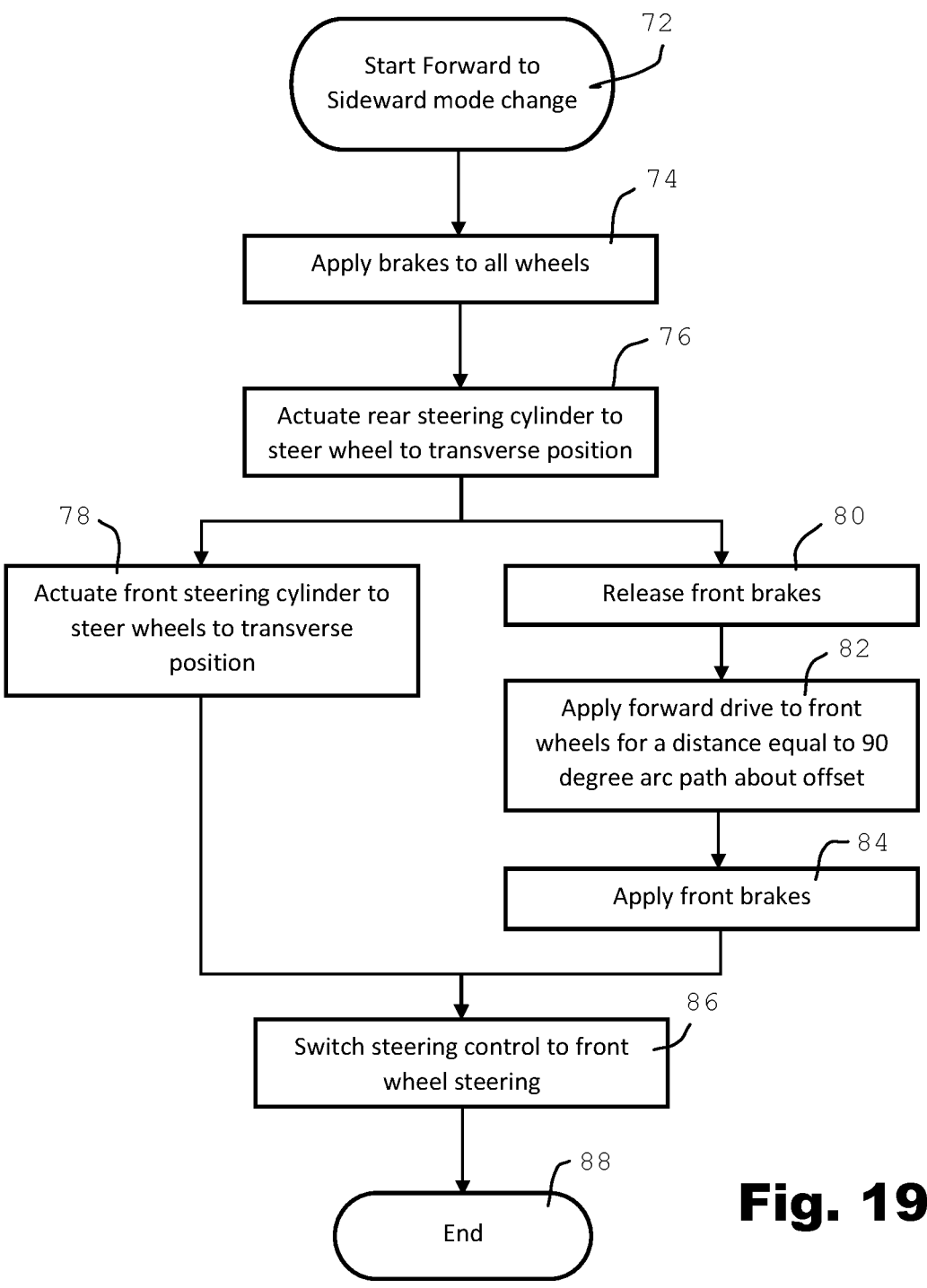
FIG. 19 is a flowchart of the sequence of operations in the transition from forward to sideward mode.

In FIG. 19, following the receipt of a signal to change mode, the forward to sideward mode change is initiated, step 72. The brakes are applied on all wheels 74, and then the rear steering cylinder is actuated to steer the rear wheel into the transverse position 76. Following this, the front steering cylinder is actuated to steer the front wheels also to the transverse position 78. Simultaneously with the steering cylinder operating, the front brakes are released 80, and forward drive is applied to the front wheels to drive them the required distance along the 90-degree arc that will translate them from the straight-ahead position to the sideward position 82. The front brakes are then applied 84, and the steering control is switched to front wheel steering 86, so that movements of the steering wheel will cause actuation of the front steering cylinders rather than the rear cylinder as happened before the mode change. When the mode change process ends 88, the truck is operating in sideward mode.

Figure 20:
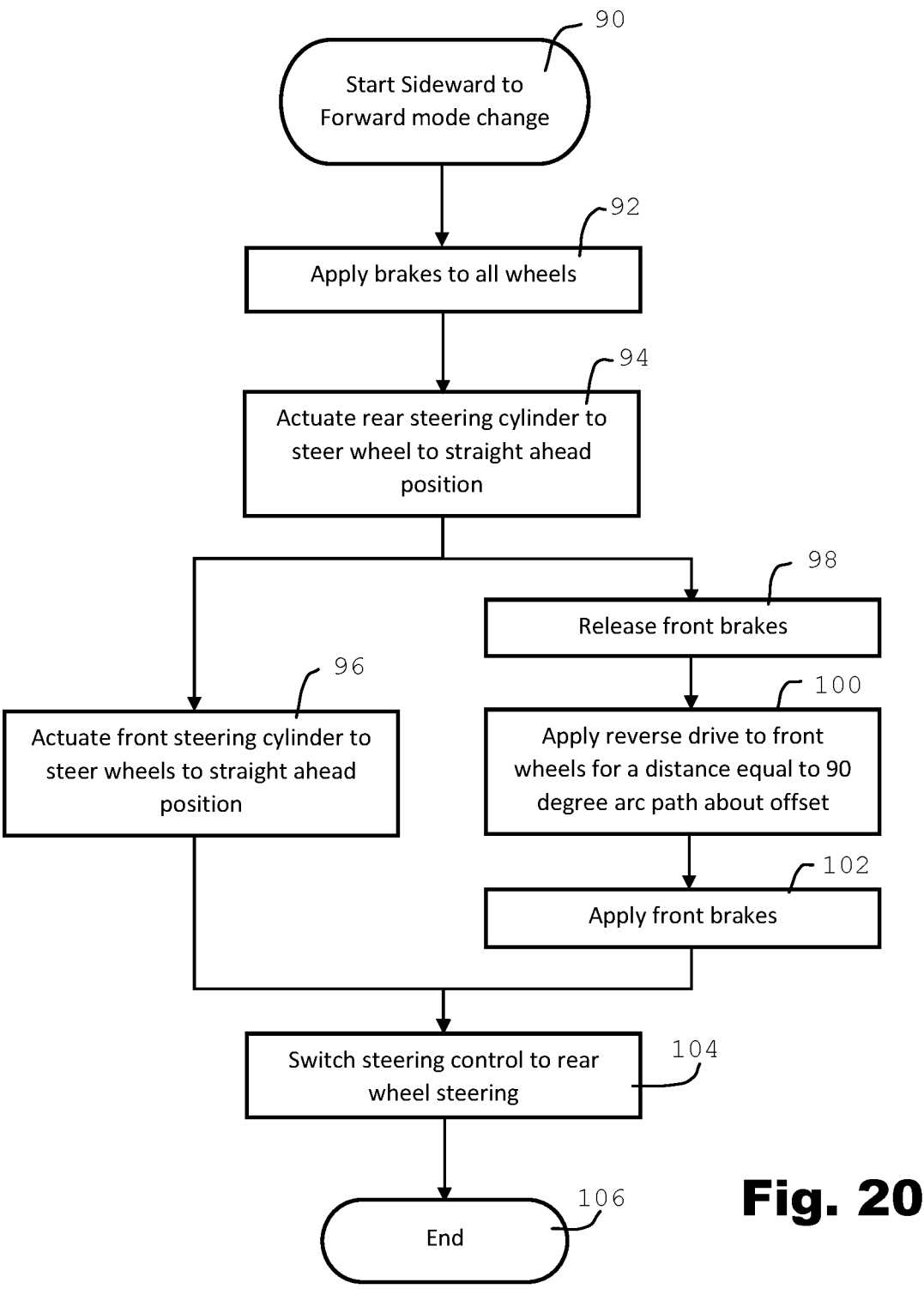
FIG. 20 is a flowchart of the sequence of operations in the transition from sideward to forward mode.

FIG. 20 shows the corresponding process for changing from sideward to rearward mode. Following the receipt of a signal to change mode, the sideward to forward mode change is initiated, step 90. The brakes are applied on all wheels 92, and then the rear steering cylinder is actuated to steer the rear wheel into the straight-ahead position 94. Following this, the front steering cylinders are actuated to steer the front wheels also to the straight-ahead position 96. Simultaneously with the steering cylinders operating, the front brakes are released 98, and forward drive is applied to the front wheels to drive them the required distance along the 90-degree arc that will translate them from the sideward position to the straight ahead position 100. The front brakes are then applied 102, and the steering control is switched to rear wheel steering 104, so that movements of the steering wheels will cause actuation of the rear steering cylinder rather than the front cylinders as happened before the mode change. When the mode change process ends 106, the truck is operating in forward mode.

Figure 21:
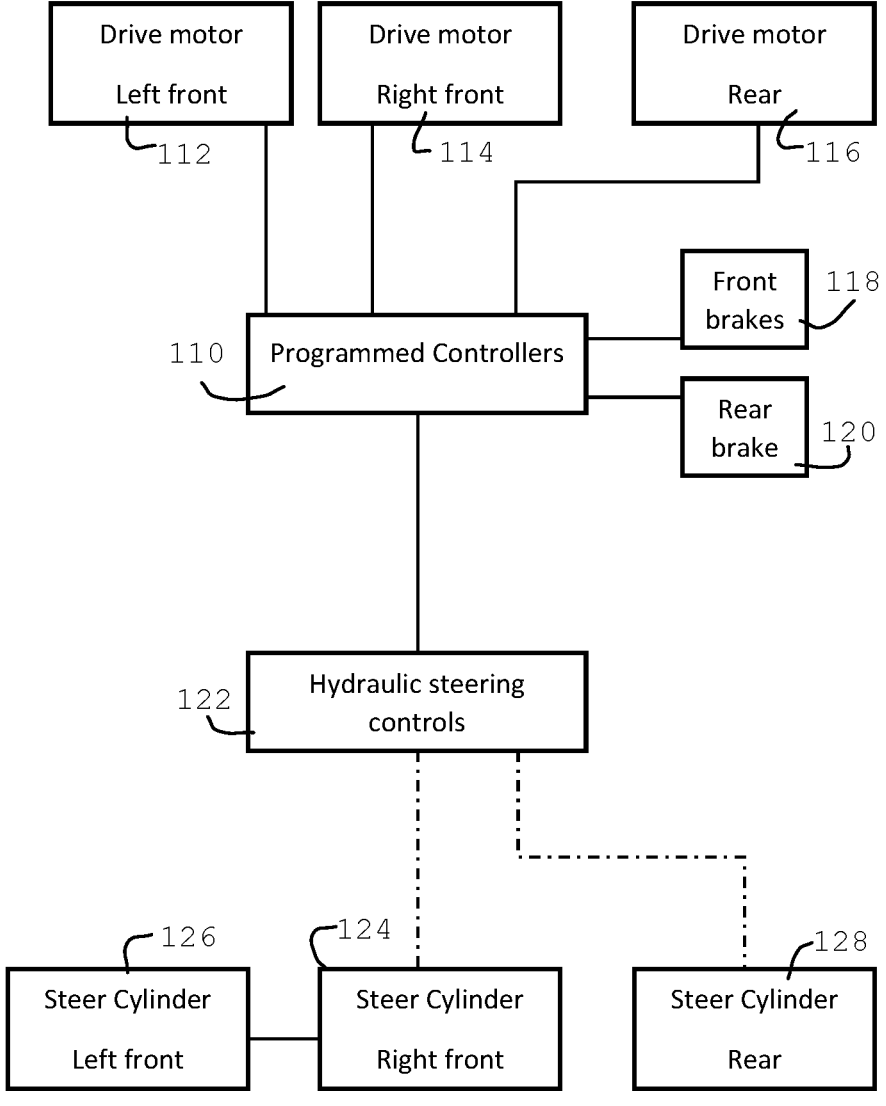
FIG. 21 is a schematic block diagram of the control circuit of the forklift truck.

FIG. 21 is a block diagram of the control system, in which a set of programmed controllers 110 operating in accordance with the flowcharts of FIGS. 18-20 (appropriately programmed using stored program instructions in known manner) communicate drive signals to the drive motors at the left front wheel 112, right front wheel 114 and rear wheel 116. They also communicate brake signals to the front brakes 118 and the rear brake 120. Hydraulic steering controls 122 receive steering signals from the steering wheel and are hydraulically connected to the right front steering cylinder 124 (which in turn is hydraulically connected to the left front steering cylinder 126) and to the rear steering cylinder 128. The hydraulic steering controls 122 are provided in the form of valves and hydraulic circuits which are electromechanically switchable using signals from the programmed controllers 110 to operate the steering in sideward or forward mode. Depending on the state of the valves, hydraulic fluid may be directed to either the front cylinders 124, 126 or to the rear cylinder 128 when the steering wheel is turned.

Figure 22:
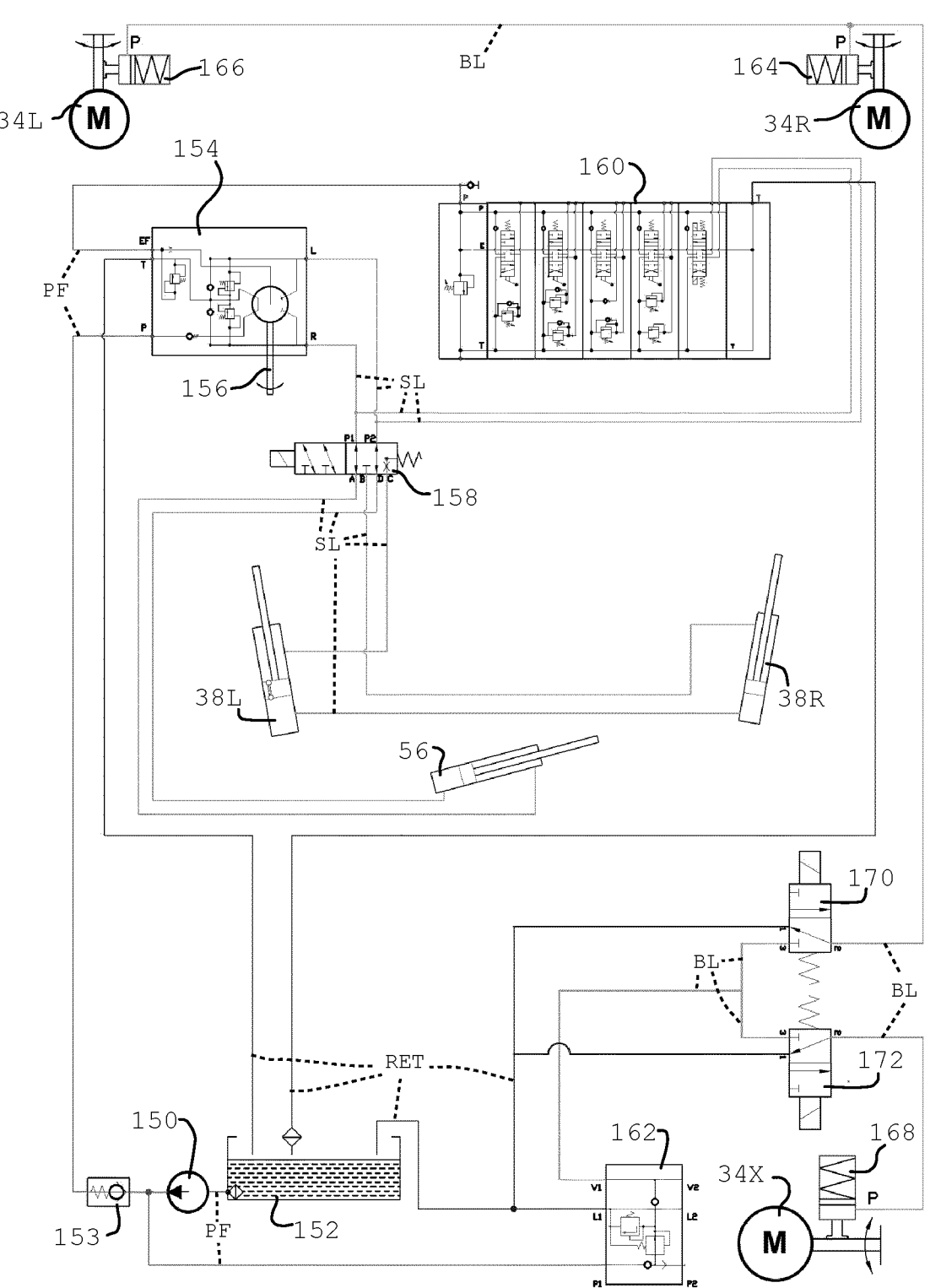
FIG. 22 is a hydraulic circuit diagram of the steering and braking circuits of the forklift truck.
Figure 23:
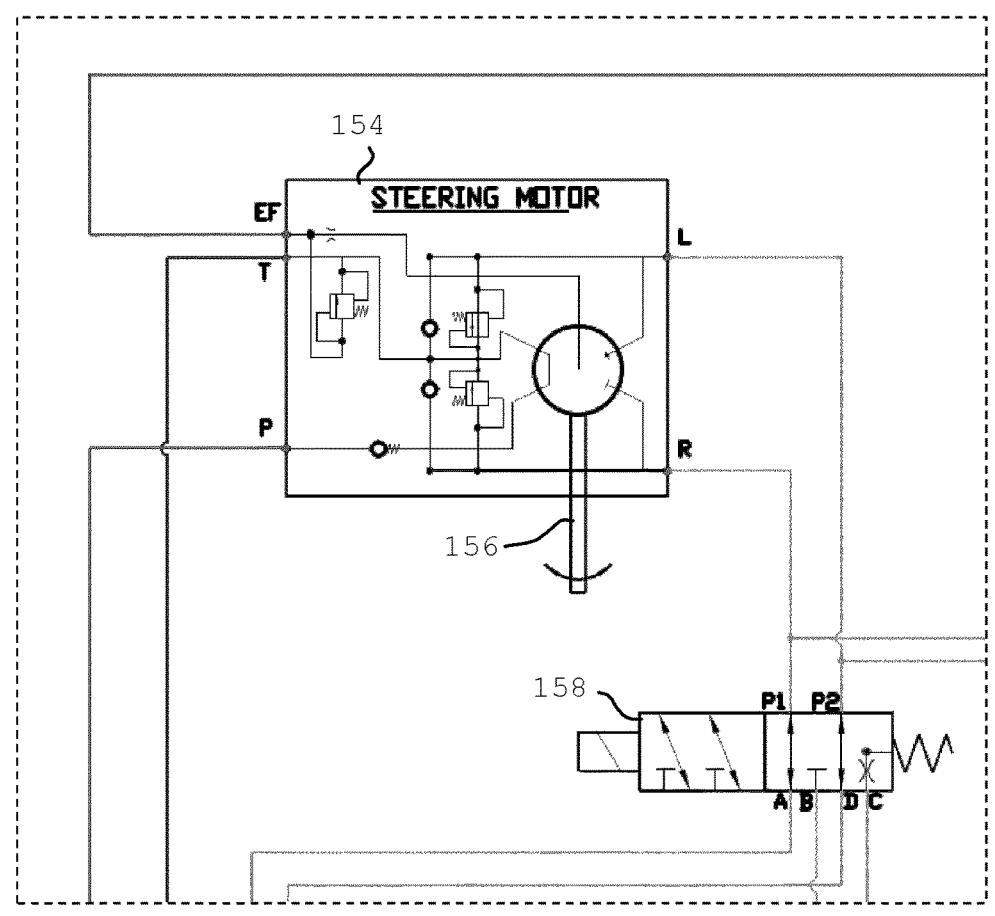
FIGS. 23-25 each contain enlarged details of different parts of the circuit diagram of FIG. 22.
Figure 24:
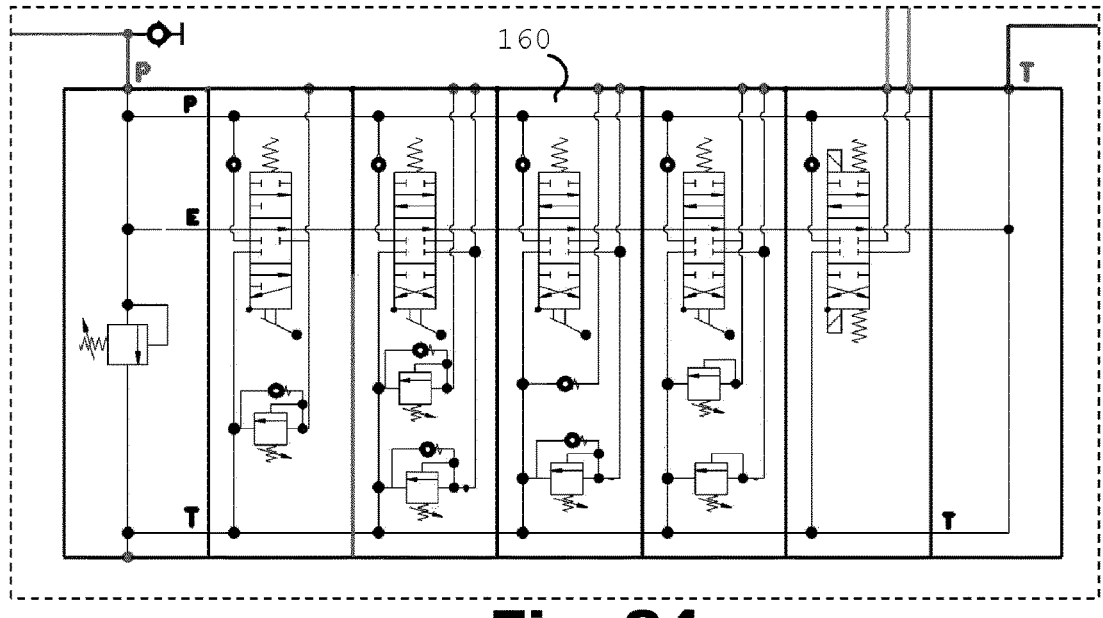
Figure 25:
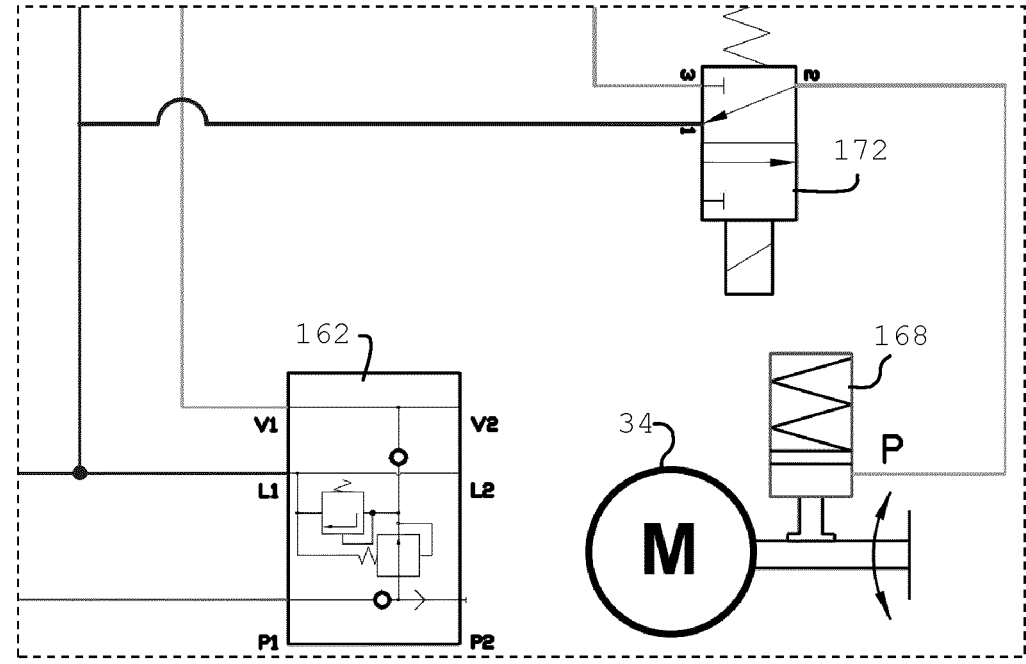

FIG. 22 is a detailed schematic diagram of the steering and braking hydraulic circuits, while FIGS. 23-25 show enlarged details of parts of FIG. 22 to better show the components illustrated.

In FIG. 22 there are four categories of hydraulic line connecting components. These lines are indicated (using dotted lead lines) with "SL" for steering lines, "BL" for brake lines, "PF" for pump feed lines, and "RET" for tank return lines.

Certain components of the embodiments already described are visible in FIG. 22. In particular there are three electric drive motors which respectively drive the left front wheel (motor 34L), the right front wheel (motor 34R) and the rear wheel (motor 34X). The front wheels are steered by respective steering cylinders 38L and 38R, and the rear wheel is steered by rear steering cylinder 56. The motors each drive a respective axle which is acted on by a respective SAHR brake, shown as right front brake 164, left front brake 166 and rear brake 168. As described previously the brakes are advantageously hub-mounted and integrated with the respective motor and gearbox for each wheel.

Hydraulic fluid is supplied by a pump 150 fed from a tank 152. A filter (unlabelled but shown as a diamond bisected by a line) is visible at the tank outlet to the pump. The fluid for the steering circuit passes through a non-return valve 153 and is then fed into a steering motor 154 having a shaft 156 connected to a steering wheel. A six-port diverter valve 158 receives the steering lines SL from the steering motor 154, and this valve is operable as previously described to direct the steering control to either the rear steering cylinder 56 or the front steering cylinders 38L, 38R. It can be seen that the front steering cylinders 38L, 38R are series connected in a push-pull arrangement so that they operate together in a synchronised manner. FIG. 23 shows the steering motor 154, steering shaft 156 and diverter valve 158 in greater detail.

The steering circuit also includes an electrically controlled valve bank section 160 which performs the operation to change the wheel orientation from forward to sideward mode and vice versa, as shown in greater detail in FIG. 24, and previously described in relation to FIGS. 19 and 20.

The braking circuit is supplied with hydraulic fluid also by pump 150, via a branch that leads to a pressure reducing valve 162 to reduce the pressure from the pump to the lower pressure required by the brakes. A front brake valve 170 and a rear brake valve 172 are independently operable to release the pair of front brakes 164, 166 or the rear brake 168 (recalling that in this embodiment the brakes are spring applied but hydraulically released). The valves 170, 172 are electrically controllable to apply and release the brakes both under operator control and under control of the programmable controller to carry out the sequence of brake applications and releases described in relation to FIGS. 19 and 20. The pressure reducing valve 162, rear brake valve 172, rear motor 34 and rear brake 168 can be seen in greater detail in FIG. 25.

Figure 34:
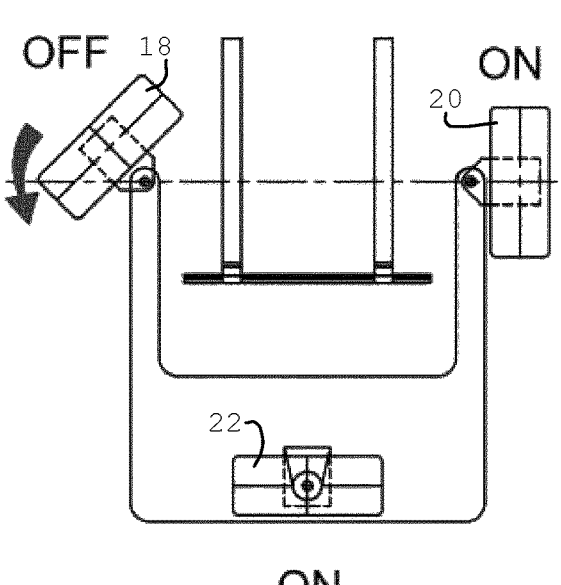
Figure 35:
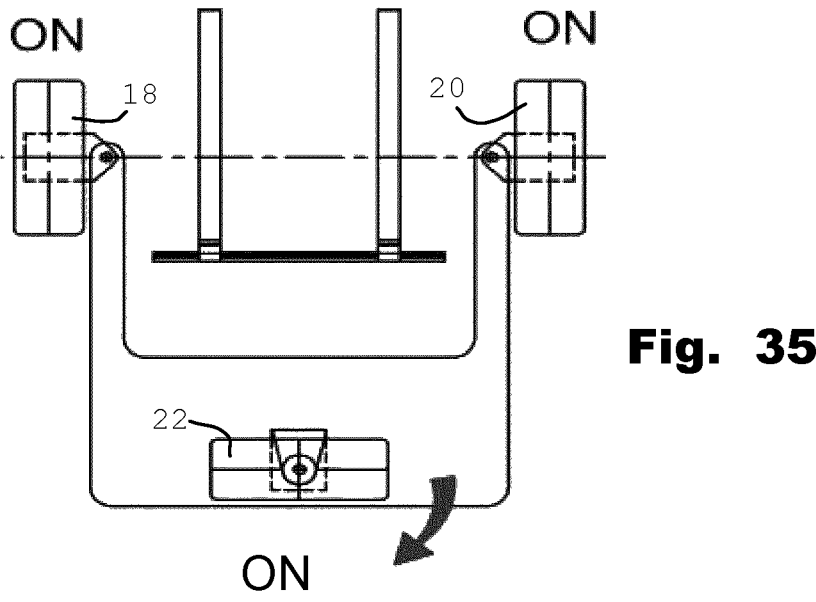
Figure 36:
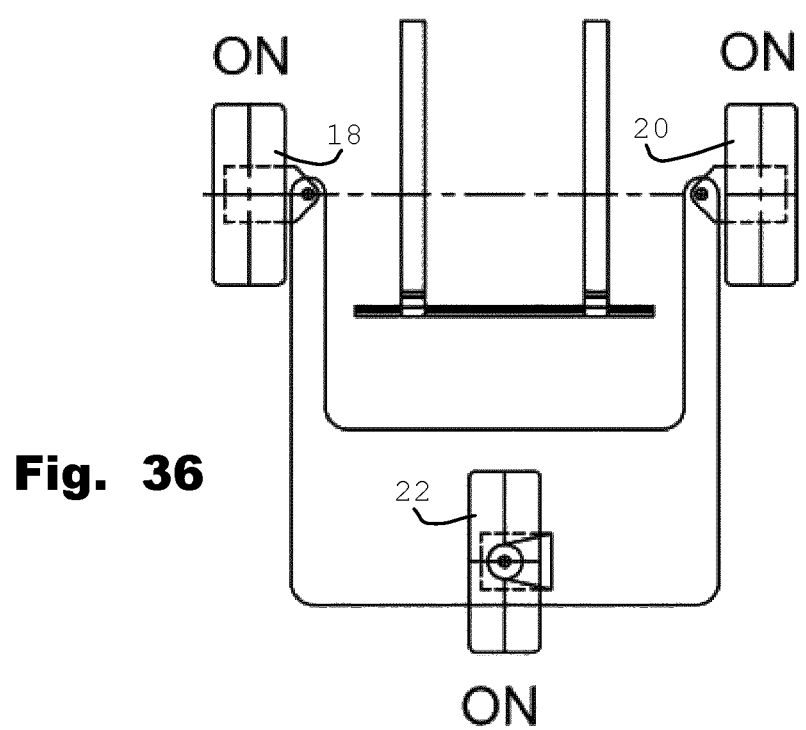

FIGS. 26-36 show the truck of FIG. 1 during a mode change operation with a different sequence of operations from that described previously. In FIGS. 26-31, the truck transitions from forward mode (FIG. 26) to sideward mode (FIG. 31), and then in FIGS. 32-35 the truck transitions from sideward mode (FIG. 32) to forward mode (FIG. 36).

In each of FIGS. 26-36, the word "ON" or "OFF" beside each of the wheels 18, 20, 22 indicates whether a respective brake, which can be independently applied to or released from that wheel under the control of the controller that sequences the mode change operation, is applied ("ON") or released ("OFF"). The heavy curved arrows, seen beside individual wheels throughout this series of operations, denote a steering operation to pivotally rotate the indicated wheel assembly.

Figure 26:
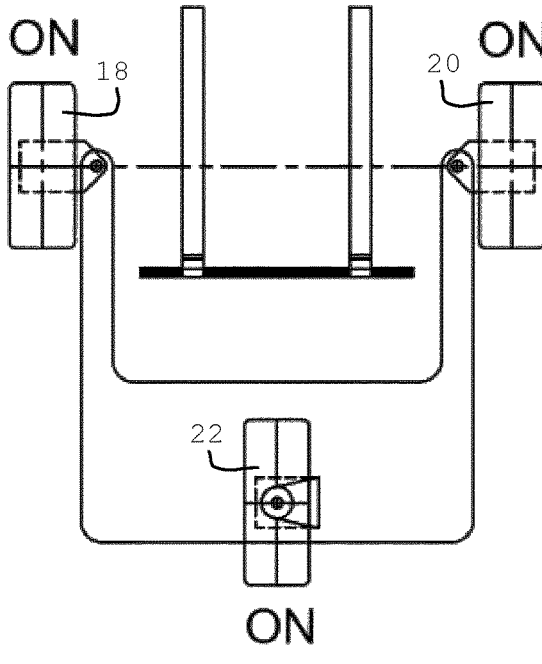
FIGS. 26-31 show a second embodiment illustrating successive stages in a transition from forward mode to sideward mode.
Figure 27:
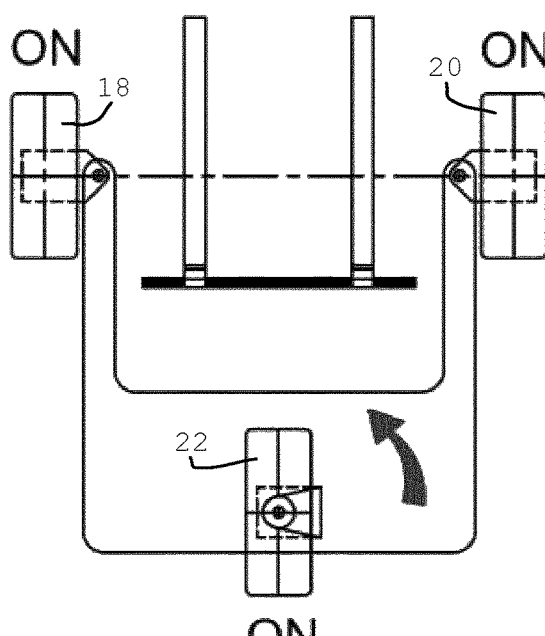

In FIG. 26 the truck is seen in its forward mode, prior to the mode change operation. When mode change is initiated, all of the brakes are applied, as can be seen from the indication "ON". In FIG. 27 the rear wheel 22 begins to rotate about its vertical axis. Because the axis of pivoting rotation passes through the point of contact with the ground, the brake can remain applied to rear wheel 22, and at the end of this rotation as seen in FIG. 28 the rear wheel is transverse to the main axis of symmetry of the truck.

Figure 28:
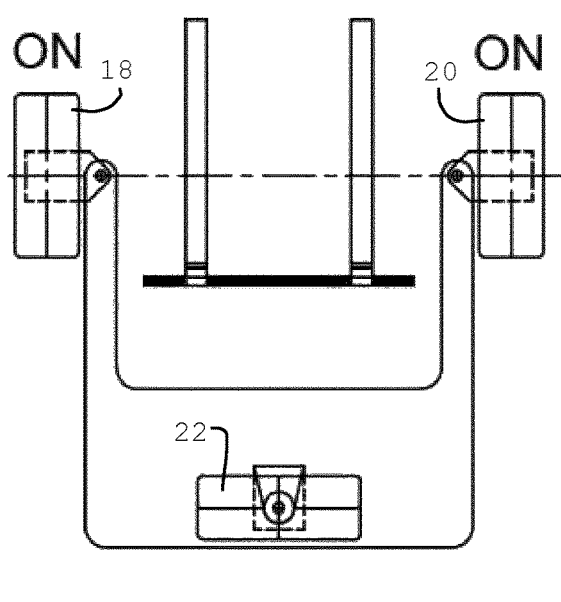
Figures 29, 30, 31:
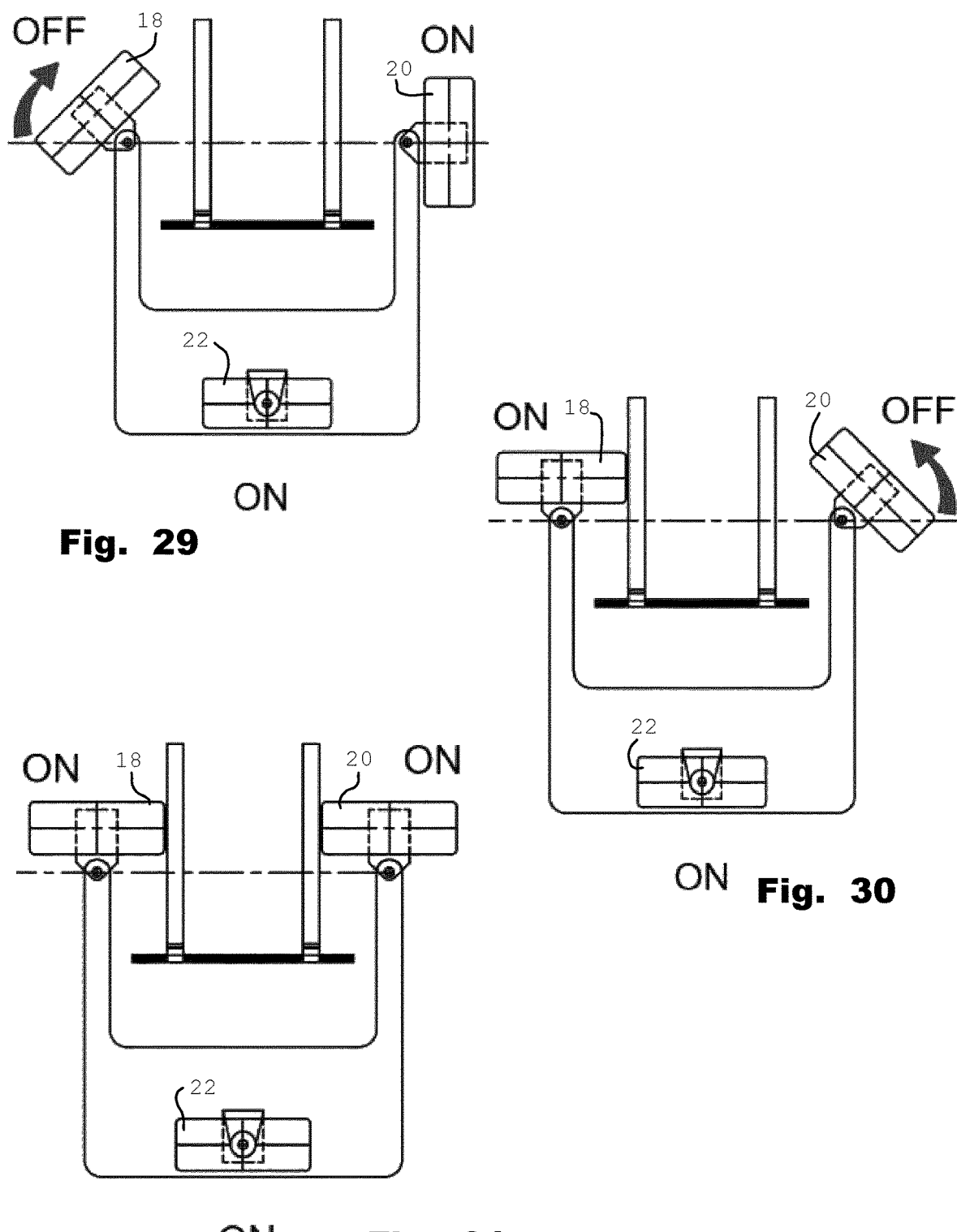

Next, in FIG. 29, the brake is released from front left wheel 18, and the electric motor that drives the pivoting rotation of the left front wheel assembly is activated to cause the transition from the forward orientation of FIG. 28 to the sideward orientation achieved in FIG. 30.

The skilled person will appreciate that in this embodiment, the fact that both of the other wheels are in fixed position with their brakes applied, prevents the truck from rolling.

Therefore in this embodiment, the left front wheel 18 may be in a freewheel state as it follows the arcuate path about the pivot point of the wheel assembly with the chassis. The feature of applying drive to the wheel to match the speed of rotation and the arcuate path length is not essential in this embodiment.

However, the embodiment can be modified to incorporate the application of positive drive to the wheel as the wheel assembly is being rotated, at the option of the designer of the control system. It will be appreciated that the controller can be simpler if it does not include the functionality of positively driving the wheel along the arcuate path as the wheel assembly is pivoted, but on the other hand the highest degree of control is achieved by adding positive drive to this embodiment also.

The same considerations hold true in each other transition of the front wheels 18, 20 described in the sequences below.

FIG. 30 shows the transition of the right front wheel 20, wherein the brake has now been applied to the left front wheel 18 which has completed its transition, and the brake is released from the right front wheel 20 in order for it to be pivoted by an electric motor acting on the right front wheel assembly and to rotate in freewheel state along an arcuate path to complete the transition to sideward mode. As noted above, it is optional in this embodiment to also positively drive the right front wheel along its arcuate path during this transition.

FIG. 31 shows the end of the mode change operation, with all three wheels in sideward orientation and all three wheels braked in readiness for resumption of sideward driving control being applied.

Figure 32:
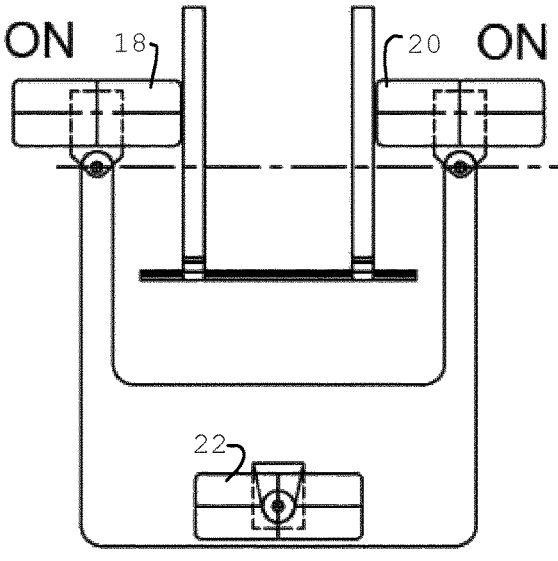
FIGS. 32-36 show the second embodiment illustrating successive stages in a transition from sideward mode to forward mode.

FIG. 32 shows the truck at the beginning of the reverse operation, from sideward to forward mode. Because all three wheels have their brakes applied in preparation for this operation, and all three wheels are transverse to the truck's main axis, FIG. 32 is indistinguishable from FIG. 31.

Figure 33:
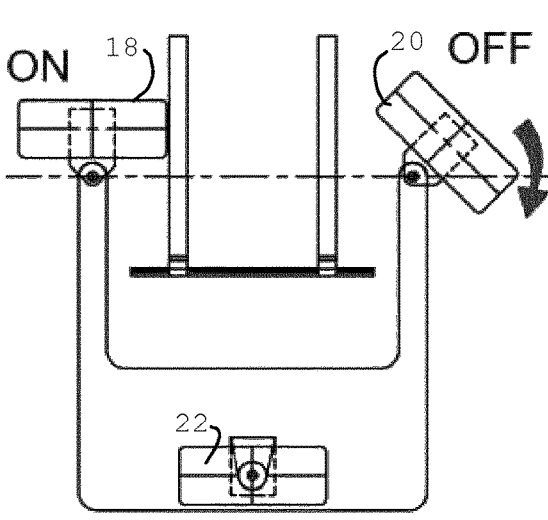

FIGS. 33, 34 and 35 respectively show the reverse operations from FIGS. 30, 29 and 27. Thus each front wheel in turn has its brake released, with the other two wheels having their brakes applied, and the unbraked wheel assembly is then pivoted about its respective pivot point and is pivotally rotated back to the forward position before applying the brake once more. Then the rear wheel assembly 22 is pivoted with its brake applied (FIG. 35) to arrive at the final position in FIG. 36.

The order of the individual pivoting operations in FIGS. 26-31 (rear→left→right) and in FIGS. 32-36 (right-→left→rear) is by no means essential and can be changed as desired. Additionally, while the order for the sideward to forward change is the reverse of the order of the forward to sideward change, these are independent mode change operations and there is no significance to them being reversed relative to each other. Furthermore, although not preferred at present, the rear wheel could be rotated at any time before, during or after the sequential pivoting of the front wheel assemblies, in either or both of the mode change operations.

While the present teaching has been described with reference to exemplary arrangements, it will be understood that it is not intended to limit the teaching of the present teaching to such arrangements, as modifications may be made without departing from the scope of the present invention. In this way it will be understood that the present teaching is to be limited only insofar as is deemed necessary in the light of the appended claims. The words comprises/comprising when used in the specification are used to specify the presence of stated features, integers, steps or components but do not preclude the presence or addition of one or more additional features, integers, steps, components or groups thereof.

The invention claimed is:

1. A steering system for a lift truck, the lift truck having a chassis with a longitudinal axis, the steering system comprising:

a pair of wheel assemblies, each of which is mounted on the chassis at a respective pivot point, the wheel assemblies being spaced apart from one another in a transverse direction on opposite sides of said longitudinal axis;

each wheel assembly having a respective ground-engaging wheel rotatable on a respective axle, the ground-engaging wheel being laterally offset from the pivot point on which the wheel assembly is mounted to the chassis;

wherein each wheel assembly is rotatable about its pivot point in a plane parallel to a ground surface when the lift truck is supported on the ground surface, with freedom to rotate through at least 90 degrees between a forward mode wherein the wheel axle is directed transversely towards the longitudinal axis and a sideward mode wherein the wheel axle is parallel to the longitudinal axis, wherein the lateral offset of the wheel from the pivot point causes the wheel to describe an arcuate path over the ground as it transitions between the forward and sideward modes;

an actuator acting on each wheel assembly operable to control the angular orientation of the wheel assembly about the pivot point;

drive means operating on each of said wheels to drive the wheels over the ground; and a controller which is operable to cause a transition between forward and sideward modes for each of the wheel assemblies by simultaneously actuating the actuator of a wheel assembly to cause said wheel assembly to pivotally rotate about its pivot point, and actuating the drive means operating on the wheel of said wheel assembly to impart positive drive to said wheel and drive said wheel along said arcuate path to assist the pivotal rotation caused by the actuator.

2. The steering system according to claim 1, wherein the drive means is controlled to drive the wheel along said arcuate path at a speed that matches the pivotal rotation caused by the actuator.

3. The steering system according to claim 1, wherein the drive means is controlled to drive the wheel by a distance that matches the length of said arcuate path.

4. The steering system according to claim 1, wherein the controller is configured or programmed with a sequence of operations to perform the actuation of the actuator and drive means of the pair of wheel assemblies in a controlled and coordinated manner to perform the transition.

5. The steering system according to claim 1, wherein the controller is further operable to control a braking system of the forklift truck, such that a brake for each of said wheels may be independently applied or released.

6. The steering system according to claim 5, wherein the controller is configured to cause the brake to be released for each wheel while the associated wheel assembly is being pivotally rotated.

7. The steering system according to claim 6, wherein the third wheel is mounted on a third wheel assembly in the same manner as said pair of wheel assemblies, the third wheel assembly being pivotally mounted on the chassis and the third wheel being offset from the pivotal mounting point of the third wheel assembly.

8. The steering system according to claim 6, wherein the steering system further comprises a third actuator acting on the third wheel assembly to control the angular orientation of the third wheel assembly about the pivot point, a drive means is provided operating on the third wheel to drive the third wheel over the ground, and said controller is operable to simultaneously actuate the third actuator to cause the third wheel assembly to pivotally rotate about its pivot point, and actuate the third wheel drive means to impart positive drive to the third wheel and drive the third wheel along an arcuate path at a speed that matches the pivotal rotation caused by the third actuator.

9. The steering system according to claim 5, wherein the controller is configured to cause the brake to be applied on each of said wheels before beginning the transition and on completing the transition.

10. The steering system according to claim 1, wherein the drive means to each of the pair of wheels is an independent electric drive motor.

11. The steering system according to claim 1, wherein the actuator for each wheel assembly is a hydraulic actuator.

12. The steering system according to claim 11, wherein the respective hydraulic actuators to the pair of wheel assemblies are ganged, with one actuator being a master and the other being a slave, such that the displacement of the two hydraulic actuators is the same and the steering angle of each wheel is equal in magnitude.

13. The steering system according to claim 1, wherein the angular positions of the wheels are changed in equal and opposite directions during the transition.

14. The steering system according to claim 13, wherein the controller is further adapted to cause the third wheel to be braked throughout the transition.

15. The steering system according to claim 1, wherein the truck is a three-wheel truck, and has a third wheel mounted on the chassis spaced apart from the wheel assemblies in the longitudinal direction.

16. The steering system according to claim 15, wherein the third wheel is disposed on the longitudinal axis of the chassis.

17. The steering system according to claim 15, wherein the third wheel is steerable through at least 90 degrees between a forward mode wherein a third wheel axle is directed transversely towards the longitudinal axis and a sideward mode wherein the third wheel axle is parallel to the longitudinal axis.

18. The steering system according to claim 15, wherein the third wheel is controlled to transition between the forward mode and the sideward mode in concert with the pair of wheel assemblies.

19. The steering system according to claim 18, wherein the controller is operable to cause said transition of the third wheel between the forward mode and the sideward mode in concert with the pair of wheel assemblies as part of a programmed sequence of operations.

20. The steering system according to claim 19, wherein said actuator for each wheel assembly is an electric motor.

21. The steering system according to claim 15, wherein the third wheel is pivotally mounted on the chassis to rotate in place without translation as it transitions between forward and sideward modes.

22. The steering system according to claim 1, wherein the truck is a four-wheel truck, a fourth wheel is preferably disposed, spaced apart from a third wheel on opposite sides of the longitudinal axis, and the third and fourth wheels are spaced apart from the pair of wheel assemblies in the longitudinal direction.

23. A steering system for a lift truck, the lift truck having a chassis with a longitudinal axis, the steering system comprising:

a first wheel assembly and a second wheel assembly, each mounted on the chassis at a respective pivot point, the first and second wheel assemblies being spaced apart from one another in a transverse direction on opposite sides of said longitudinal axis;

each wheel assembly having a respective ground-engaging wheel rotatable on a respective axle, the ground-engaging wheel being laterally offset from the pivot point on which the wheel assembly is mounted to the chassis;

each wheel assembly having a respective brake which can be selectively applied to the respective ground-engaging wheel in response to a control input;

wherein each wheel assembly is rotatable about its pivot point in a plane parallel to a ground surface when the lift truck is supported on the ground surface, with freedom to rotate through at least 90 degrees between a forward mode wherein the wheel axle is directed transversely towards the longitudinal axis and a sideward mode wherein the wheel axle is parallel to the longitudinal axis, wherein the lateral offset of the wheel from the pivot point causes the wheel to describe an arcuate path over the ground as it transitions between the forward and sideward modes;

an actuator acting on each wheel assembly operable to control the angular orientation of the wheel assembly about the pivot point;

drive means operating on each of said wheels to drive the wheels over the ground; and a controller which is operable to cause a transition between forward and sideward modes for each of the wheel assemblies by (i) simultaneously actuating the actuator of the first wheel assembly to cause the first wheel assembly to pivotally rotate about its pivot point with the wheel of the first wheel assembly unbraked, and braking the wheel of the second wheel assembly during the pivotal rotation of the first wheel assembly, followed by (ii) simultaneously actuating the actuator of the second wheel assembly to cause the second wheel assembly to pivotally rotate about its pivot point with the wheel of the second wheel assembly unbraked, and braking the wheel of the first wheel assembly during the pivotal rotation of the second wheel assembly.

24. The steering system according to claim 23, wherein the wheel that is unbraked and that is pivotally being rotated is in a freewheel state.

25. The steering system according to claim 24, wherein said controller simultaneously actuates the actuator of a wheel assembly to cause said wheel assembly to pivotally rotate about its pivot point, and actuates the drive means operating on the wheel of said wheel assembly to impart positive drive to said wheel and drive said wheel along said arcuate path to assist the pivotal rotation caused by the actuator.

* * * * *